US012789202B2

(12) United States Patent
Huntley et al.

(10) Patent No.: US 12,789,202 B2
(45) Date of Patent: Nov. 10, 2026

(54) LOW PROFILE DUST SEPARATOR

(71) Applicant: FASTER BETTER EASIER, LLC, Orion Township, MI (US)

(72) Inventors: Thomas E Huntley, Auburn Hills, MI (US); Joseph A Huntley, Greenville, SC (US)

(73) Assignee: Faster Better Easier, LLC, Orion Township, MI (US)

( * ) Notice: Subject to any disclaimer, the term of this patent is extended or adjusted under 35 U.S.C. 154(b) by 925 days.

(21) Appl. No.: 17/732,037

(22) Filed: Apr. 28, 2022

(65) Prior Publication Data

US 2022/0250093 A1 Aug. 11, 2022

Related U.S. Application Data

(63) Continuation-in-part of application No. 17/088,047, filed on Nov. 3, 2020, now Pat. No. 12,661,663,
(Continued)

(51) Int. Cl.
*B01D 45/00* (2006.01)
*B01D 45/08* (2006.01)
(Continued)

(52) U.S. Cl.
CPC ................ *B04C 1/00* (2013.01); *B01D 45/08* (2013.01); *B04C 5/081* (2013.01); *B04C 5/185* (2013.01);
(Continued)

(58) Field of Classification Search
CPC ........... B04C 1/00; B04C 5/081; B04C 5/185; B04C 5/103; B01D 45/08; B01D 45/00;
(Continued)

(56) References Cited

U.S. PATENT DOCUMENTS 845,044 A 2/1907 Baldwin
912,686 A 2/1909 Keeney
(Continued)

FOREIGN PATENT DOCUMENTS

CN 101061931 A 10/2007
CN 106388705 A 2/2017
(Continued)

OTHER PUBLICATIONS

International Search Report issued in related Application No. PCT/US2023/020301 dated Aug. 29, 2023. 4 pages.
(Continued)

*Primary Examiner* — T. Bennett Mckenzie
(74) *Attorney, Agent, or Firm* — BROOKS KUSHMAN P,C,

(57) ABSTRACT

A cyclonic particle separator includes a first member having an arcuate outer wall and an inlet port having a diameter d1 extending from the outer wall in a first direction and an outlet port extending from the wall in a second direction, the first direction being different than the second direction; a separator plate in communication with the first member; and a cyclonic chamber defined by the separator plate and the outer wall, the cyclonic chamber, the separator plate, and the outlet port having a common central axis.

14 Claims, 20 Drawing Sheets

Related U.S. Application Data which is a continuation of application No. 15/465,051, filed on Mar. 21, 2017, now Pat. No. 10,857,550.

(60) Provisional application No. 62/310,830, filed on Mar. 21, 2016.

(51) Int. Cl.

| | |
|---|---|
| ***B04C 1/00*** | (2006.01) |
| ***B04C 5/081*** | (2006.01) |
| ***B04C 5/185*** | (2006.01) |
| *A47L 9/16* | (2006.01) |
| *B01D 45/12* | (2006.01) |
| *B01D 45/16* | (2006.01) |
| *B04C 5/103* | (2006.01) |

(52) U.S. Cl.
CPC ............... *A47L 9/16* (2013.01); *A47L 9/1608* (2013.01); *A47L 9/165* (2013.01); *B01D 45/00* (2013.01); *B01D 45/12* (2013.01); *B01D 45/16* (2013.01); *B04C 5/103* (2013.01)

(58) Field of Classification Search
CPC ........... B01D 45/12; B01D 45/16; A47L 9/16; A47L 9/1608; A47L 9/165
USPC ........................................................... 55/434
See application file for complete search history.

(56) References Cited

U.S. PATENT DOCUMENTS

| | | | |
|---|---|---|---|
| 1,116,403 A | 11/1914 | Fernoch et al. | |
| 1,550,366 A | 8/1925 | Jordahl | |
| 1,754,126 A | 4/1930 | Stievenart | |
| 1,838,117 A | 12/1931 | Richard et al. | |
| 1,844,369 A | 2/1932 | Ross | |
| 1,960,887 A | 5/1934 | Alexander | |
| 1,982,733 A | 12/1934 | Forster | |
| 2,152,114 A | 3/1939 | Tongeren | |
| 2,378,600 A | 6/1945 | Tongeren | |
| 3,513,642 A | 5/1970 | Cornett | |
| 3,514,924 A | 6/1970 | Flebu | |
| 3,684,093 A | 8/1972 | Kono et al. | |
| 3,766,720 A | 10/1973 | Bloom | |
| 4,090,956 A | 5/1978 | Benzon | |
| 4,655,806 A | 4/1987 | Bowersox | |
| 5,049,171 A | 9/1991 | Pressnel et al. | |
| 5,530,781 A | 6/1996 | Takahashi | |
| 5,875,663 A | 3/1999 | Tateno et al. | |
| 6,206,617 B1 | 3/2001 | Kawazoe et al. | |
| 6,210,457 B1 | 4/2001 | Siemers | |
| 6,251,296 B1 | 6/2001 | Conrad et al. | |
| 6,746,500 B1 * | 6/2004 | Park | A47L 9/1683 55/459.1 |
| 7,247,180 B1 | 7/2007 | Hill | |
| 8,337,580 B2 | 12/2012 | Manska | |
| D703,401 S | 4/2014 | Hill | |
| D731,135 S | 6/2015 | Small | |
| D826,496 S | 8/2018 | Witter et al. | |
| D870,775 S | 12/2019 | Walko, III | |
| D914,308 S | 3/2021 | Fitzsimmons et al. | |
| D916,404 S | 4/2021 | Qiu | |
| 2002/0020154 A1 | 2/2002 | Yang | |
| 2004/0060146 A1 * | 4/2004 | Coates | A47L 9/1683 15/353 |
| 2005/0235832 A1 | 10/2005 | Anderson | |
| 2006/0286499 A1 | 12/2006 | Kim | |
| 2007/0011842 A1 | 1/2007 | Moon et al. | |
| 2007/0199284 A1 | 8/2007 | Yoo et al. | |
| 2010/0132317 A1 | 6/2010 | Thien | |
| 2010/0187180 A1 | 7/2010 | Baten | |
| 2012/0055125 A1 * | 3/2012 | Manska | B04C 5/103 55/394 |
| 2012/0137884 A1 * | 6/2012 | Steinman | F02M 25/0872 55/455 |
| 2013/0098405 A1 * | 4/2013 | Boltus | B08B 5/04 15/418 |
| 2014/0059983 A1 | 3/2014 | Ho | |
| 2014/0223868 A1 | 8/2014 | Kaufmann et al. | |
| 2017/0266596 A1 | 9/2017 | Huntley | |
| 2021/0053075 A1 | 2/2021 | Huntley | |
| 2022/0111404 A1 | 4/2022 | Hillard | |
| 2022/0250093 A1 | 8/2022 | Huntley et al. | |

FOREIGN PATENT DOCUMENTS

| | | |
|---|---|---|
| CN | 206365852 U | 8/2017 |
| CN | 207012158 U | 2/2018 |
| CN | 208677264 U | 4/2019 |
| CN | 210871292 U | 6/2020 |
| CN | 211130877 U | 7/2020 |
| CN | 211408877 U | 9/2020 |
| CN | 215605385 U | 1/2022 |
| CN | 216585679 U | 5/2022 |
| EP | 2967269 B1 | 1/2016 |
| JP | H11290724 A | 10/1999 |
| JP | 2002210389 A | 7/2002 |
| JP | 2011104570 A | 6/2011 |
| JP | 2015131265 A | 7/2015 |
| RU | 2088307 C1 | 8/1997 |
| SG | 201206232 A1 | 3/2014 |
| SU | 1327985 A1 | 8/1987 |
| WO | 2022047185 A1 | 3/2022 |

OTHER PUBLICATIONS

Dust Collection Separator, posted Nov. 8, 1999 [online], [retrieved Jul. 9, 2024]. Retrieved from internet, https://www.amazon.com/Woodstock-W1049-Large-Collection-Separator/dp/B0000223XY (Year: 1999).

Dust Collector, posted May 20, 2022 [online], [retrieved Jul. 9, 2024]. Retrieved from internet, https://www.amazon.com/Quick-Click-Dust-Collection-Separator/dp/B0B1VVVWDV1 (Year: 2022).

International Search Report and Written opinion for Application No. PCT/US2018/022898, dated Jun. 1, 2018, 7 pages.

Extended Search Report dated Nov. 25, 2020, for Application No. PCT/US2018/022898.

European Examination Report for Application No. EP 18 772 289.7, dated Feb. 24, 2023, 6 pages, cited in a related application.

NPL_1st Examination Report for Canadian Appln. No. 3056875, dated Oct. 16, 2023 which issued in a related application. 3 pages.

NPL_International Preliminary Report on Patentability & Written Opinion issued in related Application No. PCT/US2023/020301, dated Oct. 29, 2024. 7 pages.

Australian Examination Report for Application No. 2018237677, dated Nov. 15, 2022, 2 pages, cited in a related application.

NPL_Dust Collector, posted Mar. 5, 2020 [online], [retrieved Nov. 30, 2023]. Retrieved from internet, https://www.amazon.com/Oneida-Air-Systems-Super-Deputy/dp/B09WWM6X3F (Year: 2020).

NPL_Vacuum Dust Separator, posted Apr. 25, 2022 [online], [retrieved Nov. 30, 2023]. Retrieved from internet, https://www.amazon.com/Delmar-Tools-Separator-Engineered-Peformance/dp/B09GZXX9X8 (Year: 2022).

NPL_Dust Collector, posted Feb. 10, 2017 [online], [retrieved Feb. 19, 2026]. Retrieved from internet, https://www.youtube.com/watch?v=e7kpogfLjRw (Year: 2017).

NPL_Dust Cyclone, posted May 2, 2012 [online], [retrieved Feb. 19, 2026]. Retrieved from internet, https://www.youtube.com/watch?v=Ct5R6_bj80 (Year: 2012).

NPL_European Office Action dated Jun. 17, 2026 which issued in related EP Application No. 18772289.7.

* cited by examiner

LOW PROFILE DUST SEPARATOR

CROSS-REFERENCE TO RELATED APPLICATIONS

This application is a continuation-in-part of U.S. application Ser. No. 17/088,047, filed Nov. 3, 2020 now U.S. Pat. No. 12,661,663, issued on Jun. 23, 2026, which is a continuation of U.S. application Ser. No. 15/465,051, filed Mar. 21, 2017, now U.S. Pat. No. 10,857,550, issued on Dec. 8, 2020, which claims the benefit of U.S. provisional application Ser. No. 62/310,830 filed Mar. 21, 2016 (expired), the disclosures of which are hereby incorporated in their entirety by reference herein.

TECHNICAL FIELD

The present disclosure relates to a particulate separator and a method of using the same to remove dust and debris from particulate-laden air.

BACKGROUND

Devices which use centrifugal force as a primary means of separating debris from dust-laden air are commercially referred to as cyclonic or centrifugal particulate collectors or separators. These particulate separators, often called dust separators, may be configured as part of an integrated system that includes a vacuum source and a particulate collection containment, and will often have a final filtration element. Alternatively, the dust separator may be an accessory item connected to a stand-alone shop vacuum of the type commonly used in garages, home work-shops, or small commercial businesses. An accessory dust separator is generally attached directly to a bucket, a drum, or other containment for collecting debris that is generally separate from any containment associated with the vacuum source, and which can be easily disconnected for proper disposal of its contents.

SUMMARY

In one embodiment, a dust separator is disclosed. The separator includes a top member having an inlet port for introduction of dust-laden air and an outlet port for removal of clean air. The top member may have a lower portion configured as a lip and radius which equals or is greater than the diameter of the inlet port. The separator further includes a dust separator plate, housed within the lip. The separator plate includes a passage with at least one opening for removal of the dust from within the top member.

In an alternative embodiment, a dust separator is disclosed. The separator includes a top member defined by a circular outer wall and an inlet port with a diameter $d_1$ attached to the outer wall. The separator further includes a dust separator plate attached to the outer wall, the separator plate having a radius $r_1$ which equals or is greater than $d_1$.

In an embodiment, a cyclonic particle separator is disclosed. The separator has a first member having an arcuate outer wall and an inlet port having a diameter d1 extending from the outer wall in a first direction and an outlet port extending from the wall in a second direction, the first direction being different than the second direction. The separator further includes a separator plate in communication with the first member. The separator also includes a cyclonic chamber defined by the separator plate and the outer wall, the cyclonic chamber, the separator plate, and the outlet port having a common central axis. A height of the outer wall may be approximately equal to the diameter d1 of the inlet port. The cyclonic particle separator may further include a passage extending in a range of 180 degrees to 240 degrees adjacent the arcuate outer wall. The second direction may be perpendicular to the first direction. The outlet port may have a uniform diameter. The cyclonic particle separator may further include a deflector plate extending between the outlet port and the separator plate. The separator plate may include a snap-fit connection to the separator.

In another embodiment, a cyclonic particle separator is disclosed. The separator may include a first member having a curved outer wall and an inlet port extending from the outer wall. The separator may further include an irregularly-shaped separator plate, having an outside edge, attached to the first member. The separator plate and the outer wall may form a cyclonic chamber in communication with the inlet port. The separator may also include a first, clean air, outlet port extending upward from a central portion of the first member and a second, particulate matter, outlet port being defined by the edge of the separator plate and the outer wall. The first outlet port may have a height less than or equal to the height of the wall. The first outlet may be a female port. The first member may include one or more reinforcement elements located adjacent to the first outlet port. The cyclonic particle separator may further include a grounding element. The separator plate may include a plurality of indentations extending from a side of the inlet port towards the second outlet port. The first outlet port may include a deflector plate extending from a bottom rim of the first outlet port through the chamber to the separator plate. The separator plate may include a central portion having a point structured to attach the first member to the separator plate via the deflector plate.

In yet another embodiment, a cyclonic particle separator is disclosed. The separator may include a top member defined by an annular outer wall, an inlet port extending from the outer wall, and a separator plate attached to the outer wall. The separator plate and the top member may form a cyclonic chamber in communication with the inlet port having two outlet ports extending in opposite directions. The separator may also include at least one attachment device having a first part integral to the outer wall and a second part pivotably attachable to the first part and extending beyond a bottom edge of the top member. The first part may include a pair of hooks, each hook having an opening structured to receive the second part. The second part may include a pivotable portion gradually extending into an elongated body having a ledge. The ledge may include one or more protrusions. The top member may include a lip extending from a bottom portion of the wall, and the attachment device having a contour corresponding to the shape of the lip.

DETAILED DESCRIPTION

Figure 1:
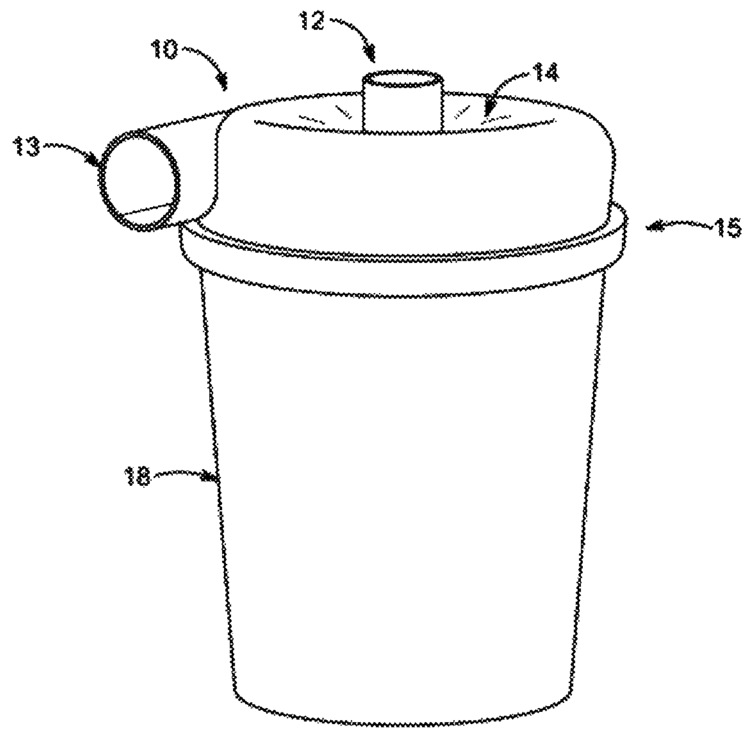
FIG. 1 depicts a perspective view of an exemplary embodiment of the low-profile cyclonic dust separator located above a collection container according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Dust separation may be the first of a two stage process where dust-laden air passes through a dust, or chip separator, and a majority of the larger particulates are separated from the air. The larger particulates are collected in a vessel attached to the separator, and later disposed. In stage two, the now substantially cleaned air exits the dust separator and flows into the containment of the shop vacuum where a second filtration process collects very fine particulates. The shop vacuum subsequently passes the clean air back into the environment.

Dust separators are sometimes delineated based on their separation efficiency. Devices that capture coarse dust and larger debris for the purpose of prolonging the cycle time between shop vacuum containment and filter cleanings may be referred to as chip separators. High-efficiency dust separators are typically devices that capture at least 99% of all debris and particulate matter, including some small particles invisible to the naked eye called fines. While both are effective at minimizing the need to occasionally service the vacuum's filter, consumers that purchase high-efficiency dust separators may want to improve the quality of air they breathe by also separating and collecting fines.

Breathing in very small particulates, or fines, has been associated with respiratory related illnesses, and is now a health concern of many. High Efficiency Particulate Arrestance filters, or HEPA filters, are generally considered to be the best measure of protection against pollution-induced respiratory illness because they are very effective at filtering fines from moving air. HEPA filters can be expensive and tend to clog quickly when used in workshops or industrial environments where dust production is unusually high. Therefore, high efficiency dust collectors, or those that capture at least 99% of incoming particulate matter, may be used in conjunction with HEPA filters as part of an air purification strategy intended to eliminate as many fines as possible. When HEPA filters are used in conjunction with a high-efficiency separator, the frequency of servicing or replacing a HEPA filter is greatly reduced.

When first introduced to the consumer market, dust separators were primarily used to capture most of the dust and debris before the air was drawn onto the containment of a shop vacuum. The process of emptying a shop vacuum may often require taking the shop vacuum to a suitable, open area where small amounts of exposed and unwanted dust are carried away in the atmosphere when the lid of the shop vacuum's containment is removed. Emptying of the shop vacuum containment is usually followed by a thorough cleaning of a filter, a generally messy step needed to restore the loss of vacuum that can occurs as the shop vacuum's filter gets clogged by the captured dust.

Attaching a cyclonic dust separator with its own collection container is an effective way of removing most particulates from dust-laden air before it is drawn into a shop vacuum. The process of separating and collecting of dust ahead of the shop vacuum simplifies the disposal of dust and extends the time between filter cleanings. Unfortunately, most devices used for this type of separation are not capable of capturing the minute particles of dust, called fines, that may be responsible for environment-related health issues. Dust separators that are not specifically designed to capture fines are generally referred to as chip collectors. Hereinafter, the term "dust separator" is intended to refer to a device generally known as a high-efficiency cyclonic particulate separator.

More recently, consumers and professionals have become aware of the need to protect their health by improving the quality of the air they breathe. Government agencies may enforce clean-air laws intended to protect workers in areas where dust production is common within a place of business. Often, small workshops, whether operated as a business or owned by hobbyists, are generally overlooked. Recent studies have found that the types and amount of dust present in the small workshops presents a serious health risk to a sizable population. The historical approach of connecting a chip collector to a shop vacuum does little, if anything, to improve air quality because fines are not filtered from the air. Shop owners and hobbyists who are aware of the potential health risks associated with fines are now seeking efficient devices for cleaning the air they breathe.

As consumer demand for improved air quality continues to grow, more options are becoming available which are intended to improve air quality in small workshops. An example choice for efficiently removing dust and debris from dusty air has historically been a cone-shaped, cyclonic dust separator.

Cyclonic separators can be very bulky and impose high spatial demands in a shop setting. Cone-shaped cyclonic separators continue to be the preferred method for high-efficiency particulate separation because of their ability to remove fines from incoming air before that air passes through a HEPA filter. Unfortunately, the science supporting this design of cyclonic separators requires them to either shrink in diameter or grow in height, and sometimes both, as a means of improving their fines separation efficiency. As a result, relatively highly efficient cone-shaped separators are often located outside of buildings because they are taller than the building which is the source of the dust-laden air they are intended to clean.

Thus, the air volume specification of commercial collectors can make this type of separator expensive to purchase and operate. Also, the design of the high-efficiency cyclonic separators results in devices that can be too tall for placement in many workshops. Indeed, the problem with siting a cone-shaped cyclonic separator usually relates to its height. Workshops that have difficulty placing a cone-shaped separator tend to rely on other devices such as HEPA filters which are also relatively expensive and require frequent servicing and/or replacement, as was mentioned above. Thus, consumers continue to seek alternative air cleaning solutions that are cost effective, easy to implement, and that provide a reliable, long-term solution for removing fine particles of unhealthy polluted dust from the air they breathe.

Accordingly, there is a need for a compact, highly efficient low-profile dust separator that can be used to remove particulates and small debris from dust-laden air that is affordable, durable, and can be put into operation with a minimal amount of site modification or adaptation. Also, this separator should have an operational efficiency that exceeds 99%.

In one or more embodiment, a high-efficiency dust separator having a low physical profile is disclosed. The present dust separator thus features a significantly different shape when compared to traditional cone-shaped cyclonic collection devices. The low physical profile relates to the height of the separator which may be defined by the diameter of the inlet port and/or the separator radius in relation to its height. The separator is capable of removing more than 99% of debris, particles, fines, and a combination thereof from the dust-laden air supplied to the separator. The term clean air exiting the outlet port relates to air containing less than 1% of the debris, particles, fines, and the like which was supplied to the separator via the inlet port.

In one or more embodiments, a dust separator is disclosed. The dust separator is a cyclonic dust separator. The separator may have a low-profile shape. The dust separator utilizes centrifugal force and inertia to separate particulate matter from air. The separator is designed to be compatible with most shop vacuums commonly used to collect wood dust and debris that is a byproduct of woodworking.

While the description herein relates to the use of the dust separator in woodshops, the same principal, shape, and configuration may be increased to serve industrial systems. Thus, when scaled to greater dimensions, the presently disclosed design may make it possible to upgrade existing central shop vacuum systems to high efficiency particulate separators having performance on par with much taller cyclones.

Additionally, while this disclosure makes reference to wood dust and debris entrained in air, other types of dust and debris may also be separated in a similar manner by using various embodiments of the present disclosure. For example, the dust removable by the separator disclosed herein may include any dust particle including visible and invisible, floating and fallen particles of solid material. The debris, dust particles, particulate matter, the fines, and the like may have various sizes from about 1 μm up to the size of the maximum diameter of the inlet port, the width of the first end of the passage, or both. Examples of the dust include pollen, dust from various industrial productions including dust from polymeric materials, metal dust such as aluminum, steel, silicon, concrete, chalk, coal, sand, clay, rubber, leather, fiberglass, carbon fibers, brick, agricultural dust including grain dust, the like, or a combination thereof.

The present disclosure provides highly efficient separation of particulates from dust-laden air and may be made in a size that fits one or more standard cylindrical containers, or it may be scaled in size to fit variety of other types of containers. The present dust collector's compact size, simplicity of design, operational efficiency, reliability, and compatibility with multiple collection containers allows the dust separator to be used in a variety of settings where clean air is desirable. One non-limiting example embodiment includes a low-profile dust separator positioned on top of a bucket and being connected by a hose to a consumer-type shop vacuum. Other applications relating to a variety of non-commercial and commercial applications are anticipated.

Figure 7:
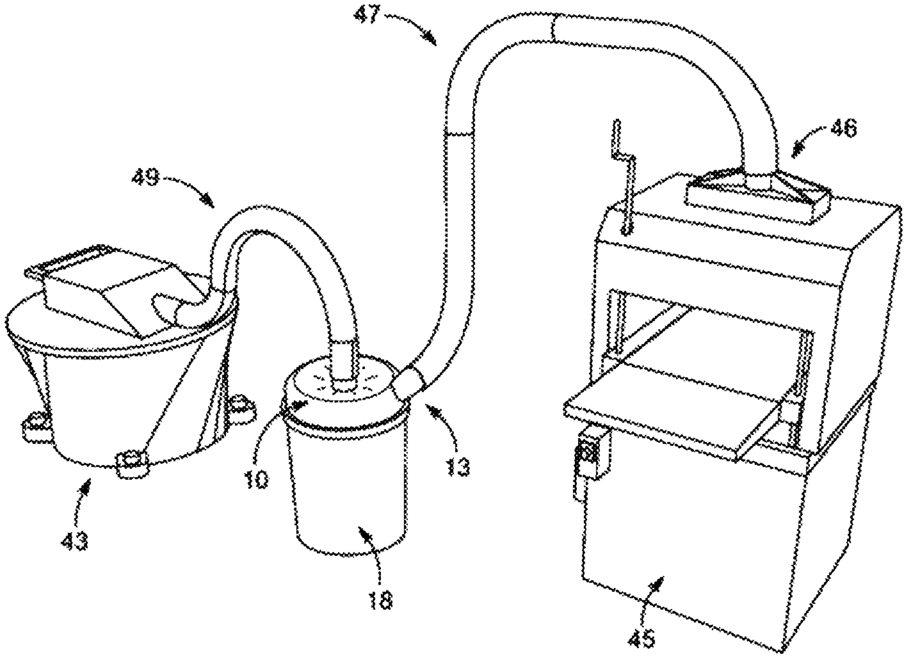
FIG. 7 illustrates an exemplary low-profile cyclonic dust collector depicted in FIGS. 1-6 connected to a tool generating polluted air and a shop vacuum.
Figure 8:
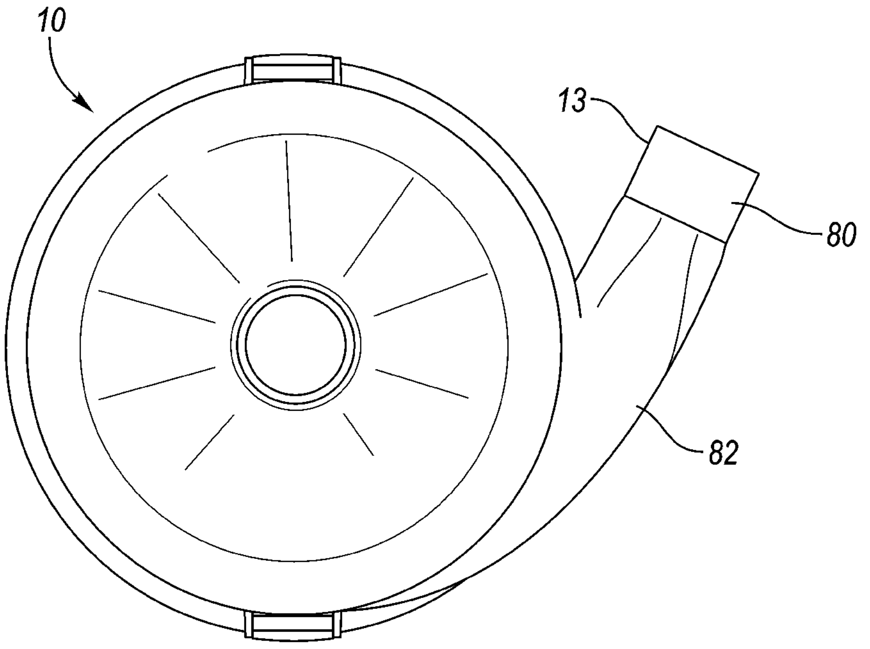
FIG. 8 shows a top view of a dust separator with an extended inlet port according to one or more embodiments disclosed herein.
Figure 9:
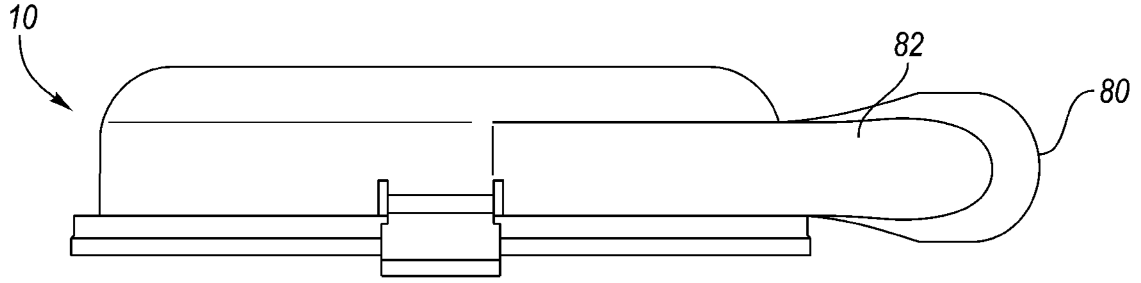
FIG. 9 shows a front view of the separator shown in FIG. 8.
Figure 10:
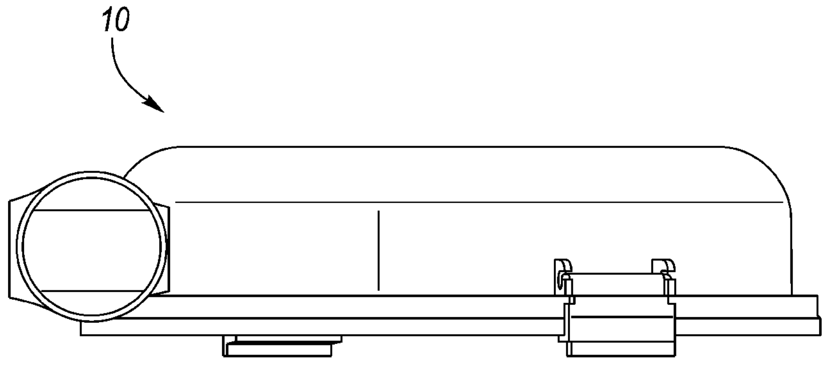
FIG. 10 shows a right view of the separator shown in FIG. 8.
Figure 11:
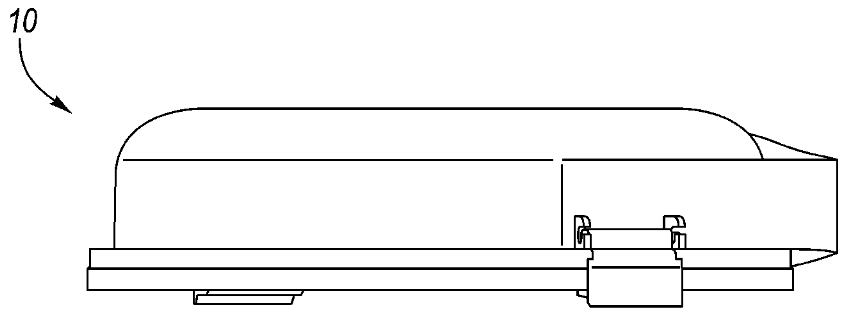
FIG. 11 shows a left view of the separator shown in FIG. 8.
Figure 12:
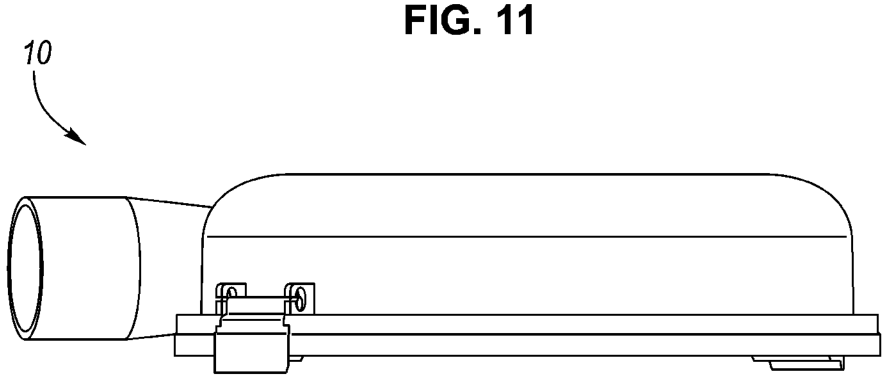
FIG. 12 shows a rear view of the separator shown in FIG. 8.
Figure 13:
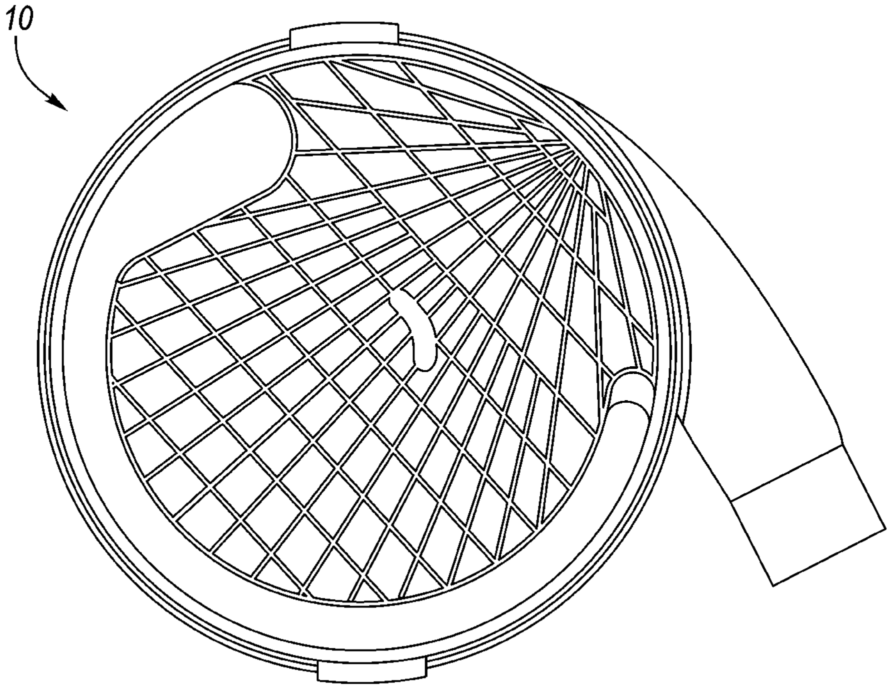
FIG. 13 shows a bottom view of the separator shown in FIG. 8.
Figure 14:
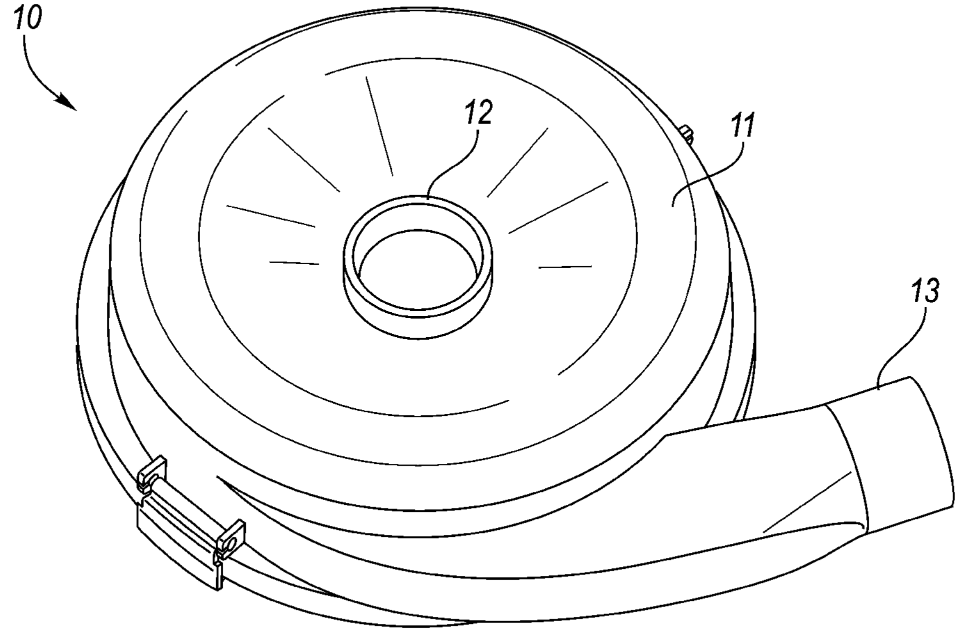
FIG. 14 shows a top front right perspective view of the separator shown in FIG. 8.
Figure 15:
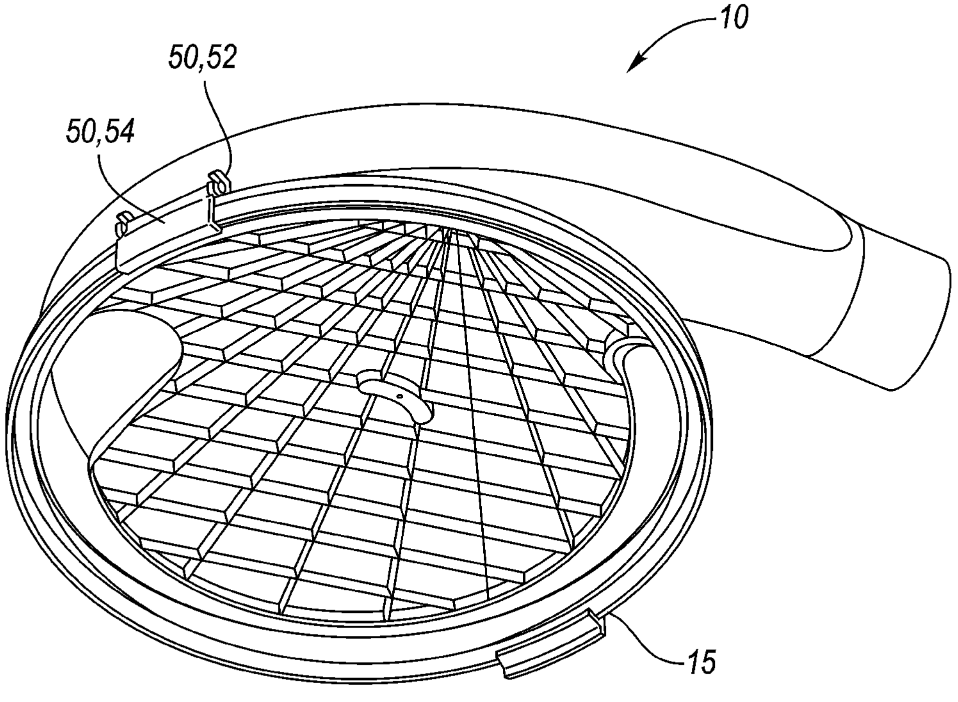
FIG. 15 shows a bottom front right perspective view of the separator shown in FIG. 8.
Figure 16:
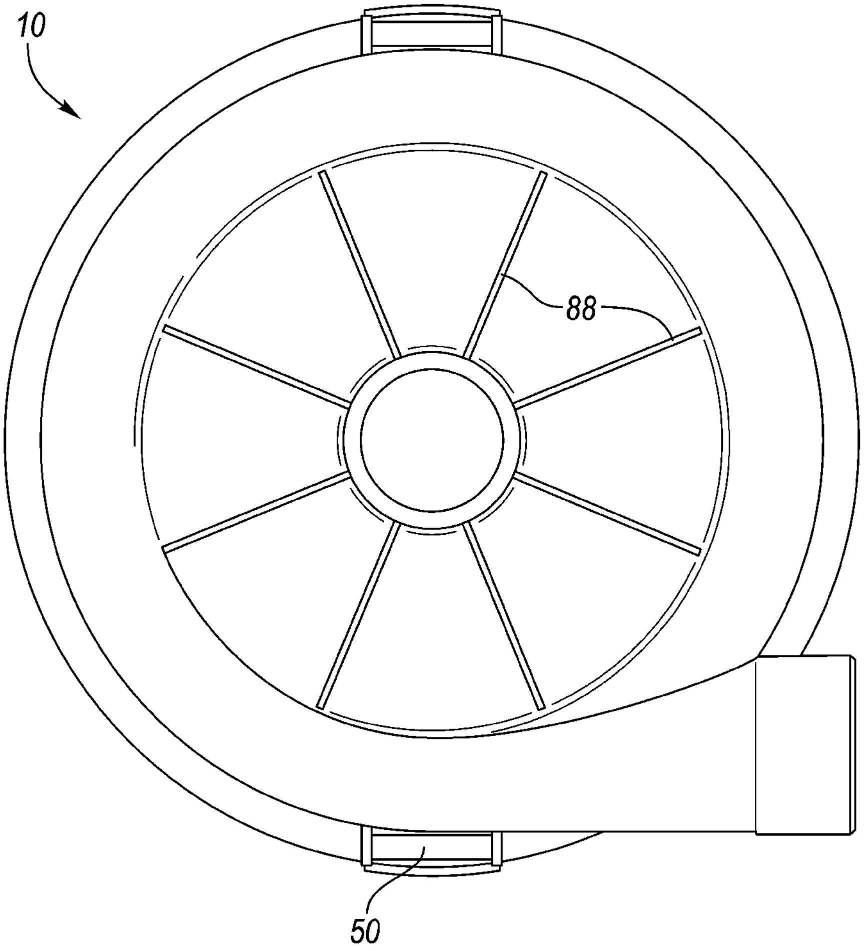
FIG. 16 shows a top view of a dust separator according to one or more embodiments disclosed herein.
Figure 17:
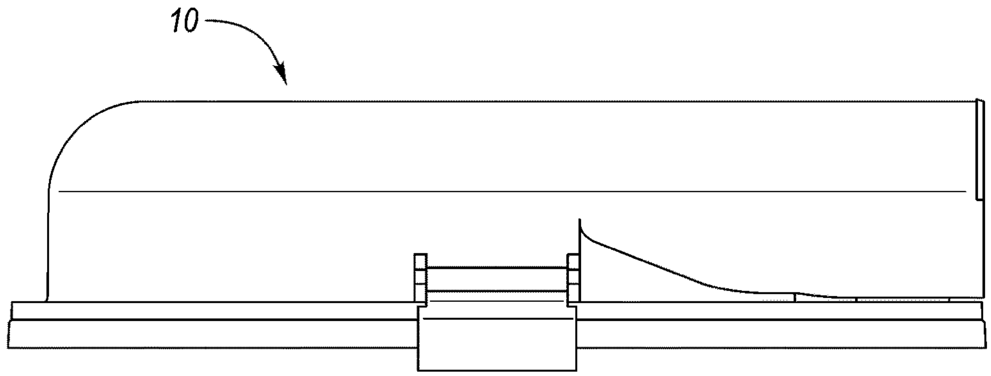
FIG. 17 shows a front view of the separator shown in FIG. 16.

The dust separator includes a top member and a separator plate. The top member 11 may be also called a first member 11. As can be seen in FIG. 1, the dust separator 10 includes a top member 11. The top member 11 includes an inlet port 13 with an opening or chamber opening 17 (shown in FIG. 2) leading into a cyclonic chamber 14. The top member 11 may also include a lip or ledge 15 in its lower portion. The lip 15 extends beyond general periphery of the top member 11. The top member 11 further includes an outlet 12 which may be connected by a hose to a source of vacuum which is often a shop-vacuum (schematically depicted in FIG. 7). The inlet 13 and outlet 12 may have circular cross-sections. The outlet 12 is a first outlet or a clean air outlet port 12.

Other cross-sections are contemplated. For example, the cross-section may be square, square to circular, circular to square to circular. The transition from square to circular may be gradual. A non-limiting example of the circular to square cross-section is shown in FIGS. 8-15.

The inlet port 13 may be within the general geometry of the separator 10. The entry port 13 may include a tangential entry port. Alternatively, the inlet port 13 may be extend beyond the general geometry of the separator 10. The overall shape or outline of the separator 10 with the extended inlet port 13 may be that of a nautilus or nautilus-like. A non-limiting example of the extended version of the inlet port 13 is shown in FIGS. 8-15. The inlet port 13 may a wrap-around port, goose neck, an elongated tube having the same, different, changing, altering, alternating cross-section throughout its length. The entry port may start with a circular cross-section which gradually changes into a square cross-section before opening to the chamber 14. The port 13 may thus include one or more flat surfaces to increase cross-sectional area within the port to allow an increased amount of air through the port to the chamber 14. The inlet port 13 may have a first portion 80 having a first cross-section and a second portion 82 having a second cross-section. The first and second cross-section may differ.

The dust separator 10 may be placed on a collection container 18 positioned beneath the separator 10 where the separated dust and debris can fall and are held by gravity. The collection container 18 may be any container capable of holding dust and debris. A non-limiting example collection container 18 may be a bucket. The outer diameter of the separator 10 and of the collection container 18 may be the same or substantially similar to enable attachment of the separator 18 onto the collection container 18.

The dust separator 10 and the collection container 18 may form a generally airtight seal and may be held together by vacuum imparted from a vacuum source and/or by an attachment mechanism 50. The attachment may be loose or tight, temporary or permanent. The attachment may be secured by a variety of ways, for example by snapping the dust separator 16 onto the collection container 18.

The dust collector 10, the collection container 18, or both may include one or more attachment devices 50. The one or more attachment devices may include hooks, brackets, a snap-fit mechanism, interlocking features, clips, clamps, quick-release fasteners, springs, the like, or a combination thereof. The separator 10 and the collection container 18 attachment 50 may be provided in a way enabling easy removal and reattachment to help facilitate emptying of the collection container and disposing of its contents.

As can be seen in a non-limiting example of FIGS. 16-28, the attachment mechanism 50 may include more than one part. A first part 52 may be attached to the top member 11. The first part 52 may form an integral part of the top member 11. The first part 11 may not be removable from the top member 11.

A second part 54 may be a separate part. The second part 54 may be attachable, temporarily or permanently, to the top member 11. The second part 54 may be removable and/or replaceable.

The first part 52 may include one or more hooks, indentations, protrusions, dents, raised portions, openings, or the like. The second part 54 may include one or more portions matching, complementing, and/or communicating with the first part 54. In a non-limiting example, shown in detail in FIG. 26, the first part 52 may include a pair of hooks 53, spaced apart from each other. A different number of hooks, such as 1, 3 or 4, is contemplated. The hooks 53 may have a matching shape and configuration. The hooks 53 may be located on the outer wall 30 and/or lip 15 of the top member 11. Each hook 53 may include at least one opening 56 into which a second part 54 may be slidably inserted. The first part 52 may also include at least one raised portion 58, a rectangularly-shaped raised flat surface(s), which compliment a flat portion of the second part 54.

Figure 25B:
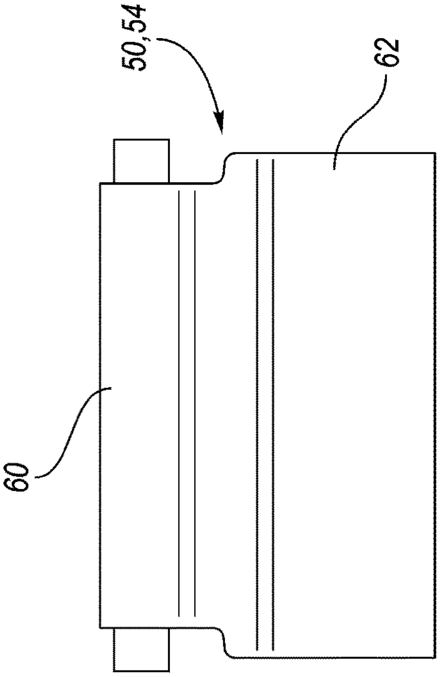
FIG. 25B shows an attachment device shown in FIGS. 24 and 25A in a detailed perspective front view.
Figure 25A:
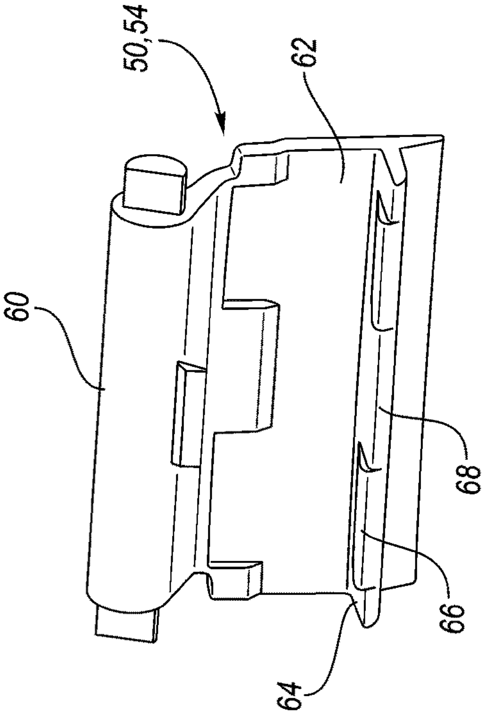
FIG. 25A shows an attachment device shown in FIG. 24 in detailed perspective rear view.
Figure 26:
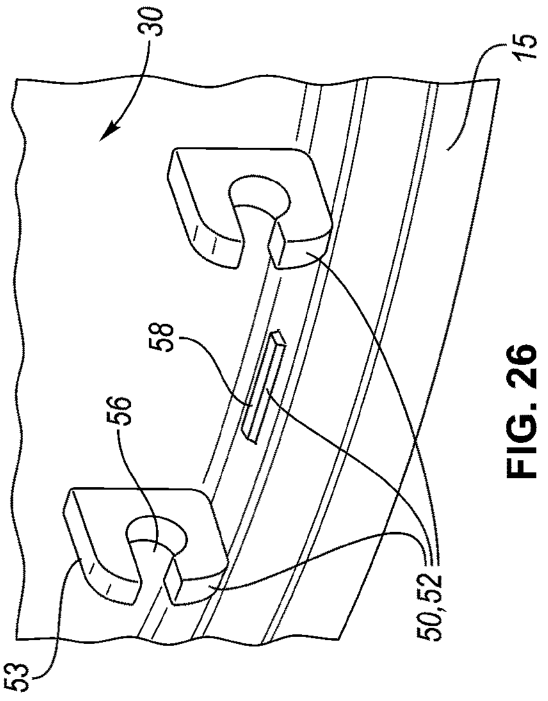
FIG. 26 shows a detailed view of a first part of the attachment device shown in FIG. 24.

A non-limiting example of the second part is depicted in FIGS. 25A and 25B. Additional views are also captured at least in FIGS. 27-34. The second part 54 may be shaped like a latch, clip, lever, handle, or the like. The second part 54 may include a pivotable portion 60 which may be inserted in one or more openings of the first part 52. The pivotable portion 60 may be a non-moving part, but is structured to communicate with the first part in a pivotable manner. The pivotable portion 60 may include a rod, shaft, or the like, which is insertable in the one or more openings 56 of the first part 52 and may pivot about a horizontal axis. The pivotable portion 60 may form the top of the second part 54. The pivotable portion 60 may extend downward into a grip portion or an elongated body 62. The elongated body 62 may be shaped like a rectangle or have another shape.

Figure 23:
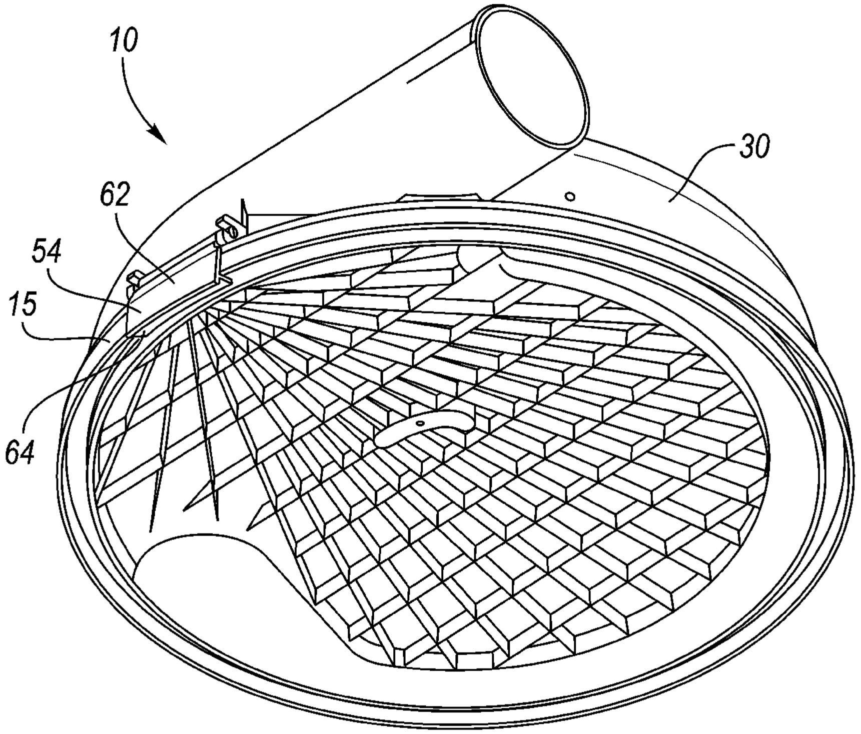
FIG. 23 shows a bottom front right perspective view of the separator shown in FIG. 16.

The elongated body 62 may be configured to rest against the wall 30 or lip 15, as is shown for example in FIG. 23. The elongated body 62 may include a ledge 64. The ledge 64 may have a flat, relatively thin surface. The ledge 64 may include one or more textured and/or raised surfaces such as protrusions 66 and/or indentations 68. The textured and/or raised surfaces may provide additional contact surfaces structured to engage the bottom portion of the top member 11, the lip 15, or the like and/or a top and/or side portion of a container 18 intended to capture the debris and particulate matter. The ledge 64 is structured to secure the separator 10 to the container 18 in a secure manner, forming an air-tight seal, or both.

The attachment device 50 may have one or more positions. In an open position, the second part 54 may be disengaged, removed, and or loosely inserted into the first part 52. In the open position, the pivotable portion 60 may be inserted into the first part 52, secured in the first part 52, or both. In the open position, the attachment device 50 may be freely movable and/or pivotable. In the open position, the attachment device 50 may rest against the top member 11.

In the second position, the elongated body 62 is engaged, secured, latched against the top member 11, lip 15, container 18, or a combination thereof such that the separator 10 is securely positioned on top of the container 18.

Figure 27A:
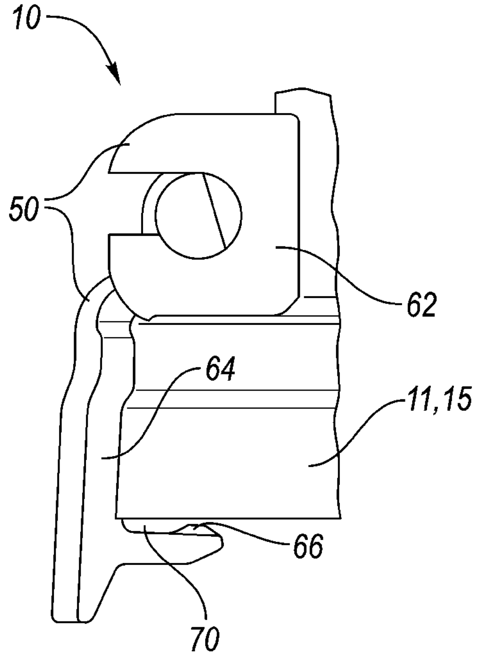
FIG. 27A shows a side view of the attachment device.
Figure 27B:
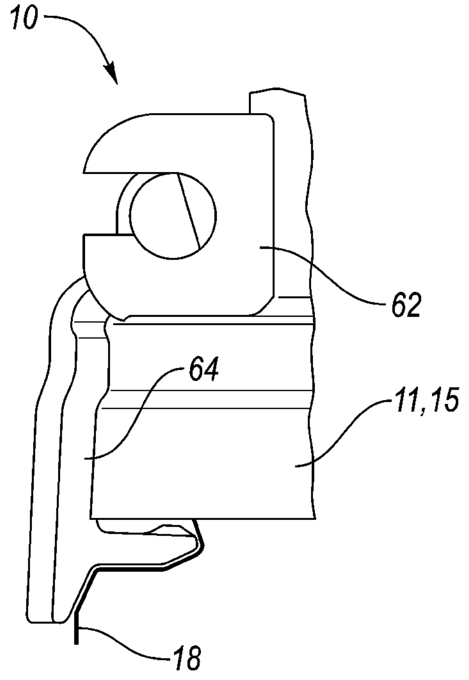
FIG. 27B shows a side view of the attachment device in a closed position, securing a collection container to the dust separator.
Figure 28:
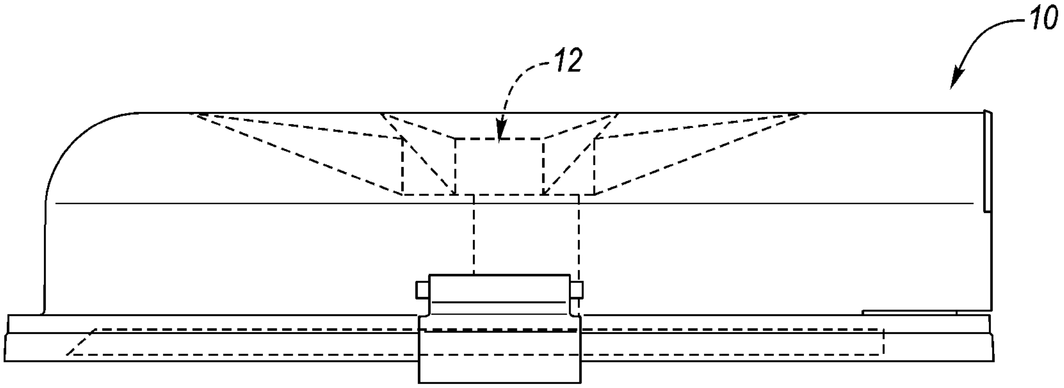
FIG. 28 shows a front view of the separator according to one or more embodiments disclosed herein.

As can be seen in FIG. 27A, a gap 70 may be formed between the top member 11 and the ledge 64 in the open and/or closed positions. The gap 70 may be structured, dimensioned to accommodate a side, top, rim, edge of the container 18, when the separator 10 is installed on the container 18. An outline of a side of a container 18 is schematically shown in FIG. 27B.

The attachment device 50 is configured to provide secure attachment and form a seal, preferably an air-tight seal between the separator 10 and the container 18. The secure attachment provides optimal conditions for the separator's performance and correct placement of the separator 10 with respect to the container 18.

The second part 54 may have a contour corresponding to the shape of the outer wall 30, the lip 15, the top member 11, or a combination thereof. The second part 54 may extend beyond a bottom edge of the top member 11, the wall 30, the lip 15, or a combination thereof.

Figure 2:
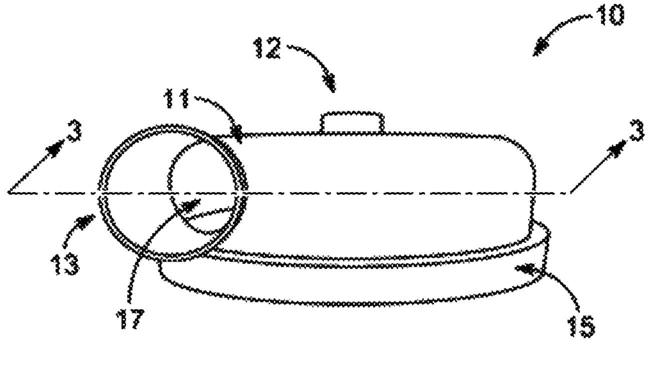
FIG. 2 depicts a top view of the low-profile cyclonic dust separator depicted in FIG. 1.
Figure 3:
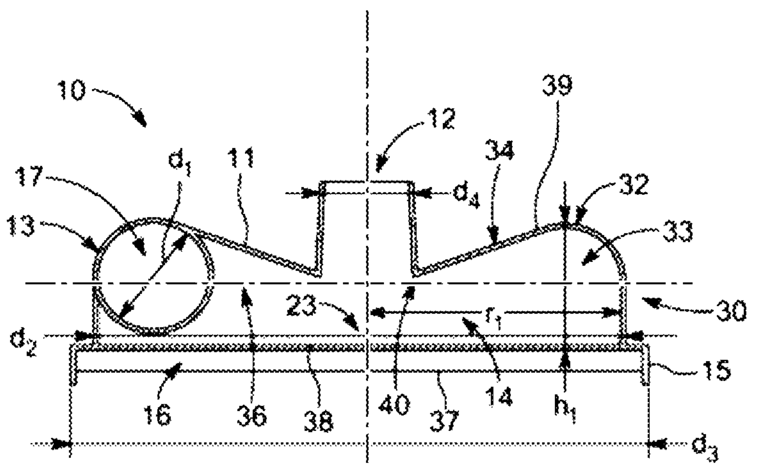
FIG. 3 depicts a cross-sectional view of the low-profile cyclonic dust separator depicted in FIG. 1 along the line 3-3.

FIG. 3 depicts a non-limiting example of the separator 10. FIG. 3 shows a cross-sectional view of the dust separator 10 depicted in FIG. 2, which offers an alternative view of the dust separator 10, depicted in FIG. 1 without the collection container 18. As can be seen in FIGS. 2 and 3, the cyclonic chamber 14 is defined by the volume of space contained between the separator plate 16, housed within the lip 15 of the top member 11, and the top member 11 above the separator plate 16.

The top member 11 includes an outer wall 30 defining its shape. The outer wall 30 may be an arcuate outer wall. The wall 30 may be an annular wall. The wall 30 may have a curved surface with an arc 32 that attaches to an inverted frustum 34. The wall 30 may curve from the lip 15 towards the outlet 12. The wall 30 may form a dome.

The top of the top member 11, the dome, the wall 30, the inverted frustum 34, or a combination thereof may include one or more reinforcement components or elements 88. The reinforcement elements 88 may add additional strength to the top member 11, stabilize the top member 11, or both. The reinforcement elements 88 may ensure that the top member's surface does not fluctuate or cave in while the separator is in operation and the pressure builds up in the disclosed system. Non-limiting examples of the reinforcement elements 88 are depicted in at least FIGS. 16 and 22. The reinforcement elements 88 may be raised portions, perpendicular to the top surface of the top member 11. The reinforcement elements 88 may be flush with the top of the top member 11, the outlet's top rim 90, or both. The reinforcement elements 88 may be distributed and/or spaced apart along the circumference of the top member 11 in a regular or irregular manner. The one or more reinforcement elements 88 may be located adjacent to or directly adjacent to the outlet port 12.

The inverted frustum 34 forms an upper wall of the cyclonic chamber 14. The cyclonic chamber 14 is a low-profile cyclonic chamber which may have a maximum height equal to the diameter $d_1$ of the inlet port 13. The height $h_1$ may exceed the diameter $d_1$. A non-limiting example height $h_1$ may be 3 times, 2 times, 1.5 times, or less than 3 or 2 times the diameter $d_1$. The cyclonic chamber 14 has a radius $r_1$ which may be equal to the diameter $d_1$ of the inlet port 13, of the opening 17, or both. The radius $r_1$ may be greater than the diameter $d_1$ of the inlet port 13, of the opening 17, or both. The radius $r_1$ may be 2 times, 3 times, less than 3 times greater than the diameter $d_1$ of the inlet port 13, of the opening 17, or both. In a non-limiting example, the height $h_1$ may not exceed the radius $r_1$. The height of the separator 10 may be lower than the radius of the separator 10.

The outer wall 30 rises to meet a rounded surface having a cross-section that may match the circumference of the inlet port 13. The rounded surface may arch upward from the outer wall 30 to the top of the chamber 14 and may continue toward the chamber's center in an arc having a fixed radius to a point where it tangentially intersects the outer edge of the inverted frustum 34. The cyclonic chamber 14 and the inverted frustum 34 derive their center point from a ray that is perpendicular to the plane of the separation plate 16. The lower plane of the inverted frustum 34 is hollowed out to form a vortex locator 40 with a diameter similar to the inlet port 13, and that is configured as a part of the outlet 12.

The outlet 12 is a clean air outlet. The outlet 12 originates from a plane established by the center line of the circular inlet port 13. The outlet port 12 extends upward. The outlet port 12 may extend to a point that is equal to the maximum height of the chamber 14, lower, or higher. The vortex locator may be thus located on the center line of the circular inlet port 13.

The arc 32 at the top of the chamber 14 may have a central point 33 derived from a radius equal to the radius of the inlet port 13. The height $h_1$ of the outer wall 30 with the curved surface having an arc 32 may equal or be substantially close to the diameter $d_1$ of the inlet port 17. The inverted frustum 34 slopes towards the center of the top member 11 and ends with the vortex locator 40. The vortex locator 40 defines an opening of the outlet 12. The cyclonic chamber 14 thus has an outlet or output port 12 at its lowest point, which is at the center of spinning layer of air, or vortex, within the chamber 14.

The frustum's 34 inner surface or face 39 establishes the barrier on the upper portion of the chamber 14 which contains the cyclonic flow of air. The flow of air into the cyclonic chamber 14, around the chamber 14, and on to the outlet 12 is free of changes in contour which cause eddies in the flow of air. The chamber 14 has a continuous surface that guides air along a smooth chamber surface to a point where the air leaves the chamber 14 via the outlet 12.

The shape and configuration of the cyclonic chamber 14 is uniform throughout the circumference of the separator 10. The cyclonic chamber 14 has a circular shape or cross-section. The inner surface of the cyclonic chamber 14 is substantially smooth such that the particulate matter flows through the chamber 14 without or only with minimal obstructions. This configuration allows for reduction of eddy currents or turbulence caused by misalignment of surfaces which guide the flow of air through the dust separator 10. Without limiting the present disclosure to a single theory, it is believed that the presence of the inverted frustum 34 results in a region of lower pressure near the top of the chamber 14 where agglomeration of fines is more likely to occur.

Uniformity and smoothness of the cyclonic chamber 14 may aid in achieving good separation. Particulates tend to stay suspended in a flowing volume of air when the air and particulates are all flowing in the same direction. When the general flow of air is caused to change direction, suspended particles have a tendency to continue moving in a straight line due to inertia and become separated from the general flow of air. Therefore, the force of inertia is the core physics principle at play in cyclonic or inertial dust separation system devices.

Any obstacle that perturbs the flow of a volume of air has a non-desirable impact on the linear travel of particulates suspended in volume of air. Sharp edges, square corners, mechanical connections of tubes, or any other obstruction that causes a sudden change in the flow of air may cause random currents of air or eddies to form, which can result in suspended particulates being scattered about. The separator 10 disclosed herein thus aims to minimize disturbances to the general flow of air to achieve optimum results of inertial separation.

Figure 4:
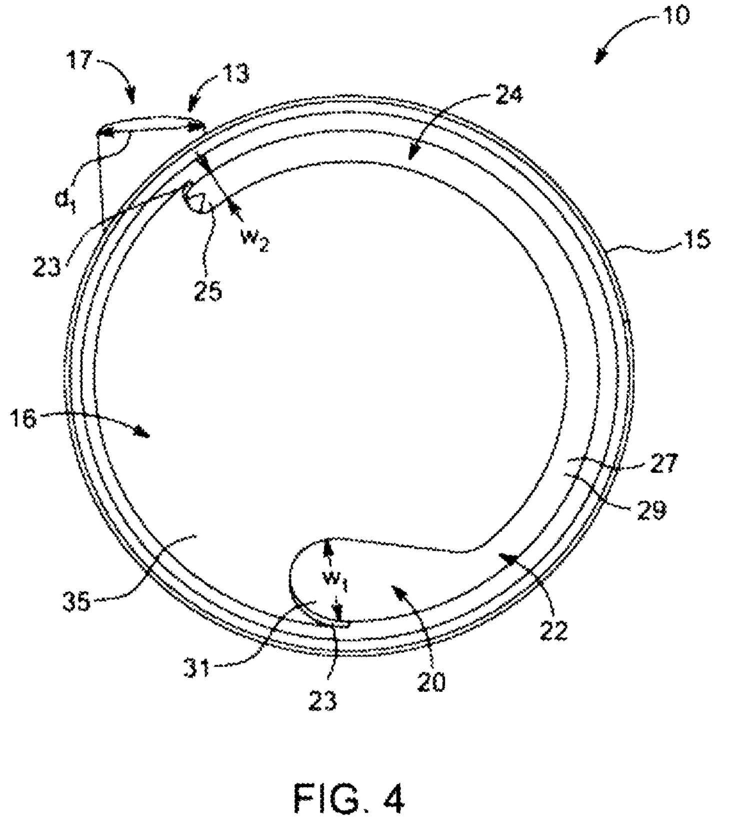
FIG. 4 shows a bottom view of the low-profile cyclonic dust separator depicted in FIGS. 1-3.

FIG. 4 shows a bottom view of the dust separator 10 having a non-limiting example of the separator plate 16 arranged within the lip 15 of the top member 11. The separator plate 16 may be in communication with the top member 11. The separator plate 16 has a generally flat surface that acts as a barrier between the cyclonic chamber 14 and a collection container 18. The separator plate 16 is intended to keep separated dust, which has passed into the collection container 18, from returning into the cyclonic flow within the chamber 14. The central point of the separator plate 16 lies on a ray 39 that is also central to the chamber 14, to the outlet 12, or both and perpendicular to the separator plate 16.

The separator plate 16 may include a rim 23 and a main portion 35. The rim 23 and the main portion 35 may form integral portions of the separator plate 16. When the separator plate 16 is installed in the top member 11, the rim 23 may run along the entire periphery of the lip 15. Alternatively, the rim 23 may run along a portion of the periphery of the lip 15. The width of the lip 15 may equal the width of the rim 23 to house, support, and/or accommodate the separator plate 16 within the lip 15 of the top member 11.

A general shape of the separator plate 16 may be irregular, the main portion 35 forming an irregular semi-circle. The rim 23 may form a semi-circular portion complementing the main portions' shape. The rim 23 may have distinct ends on each side 96. The ends 96 designate areas where the dust enters and/or leaves the passage 20. The passage 20 is thus effectively a particle outlet port or a second outlet port. The second outlet port 22 or the passage 20 is defined by the shape of the edge of the separator plate 16 and the outer wall 30, the lip 15, or both. The separator 10 may thus include two outlet ports: a first clean air outlet port 12 and a second particulate matter outlet port 20. The two ports 12, 20 lead the air and particulate matter in the opposite directions: the passage into the collection container 18 and the outlet port 12 into a hose, a vacuum device, or both.

Figure 37:
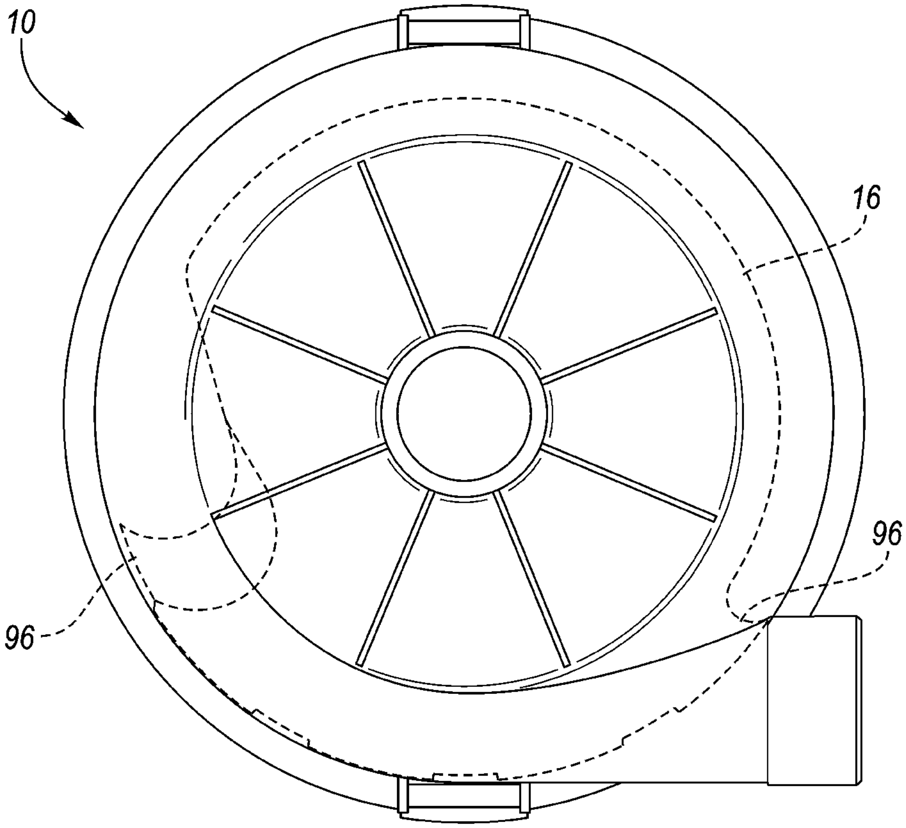
FIG. 37 shows a top view of the separator shown in FIG. 36.
Figure 38:
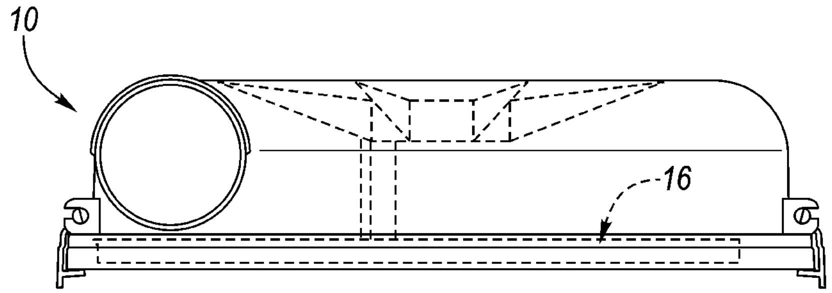
FIG. 38 shows a right view of the separator shown in FIG. 36 with a grounding element.
Figure 39:
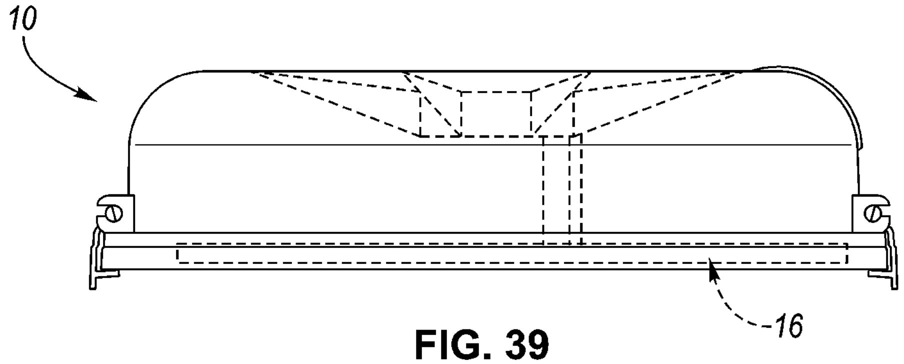
FIG. 39 shows a left view of the separator shown in FIG. 36.
Figure 40:
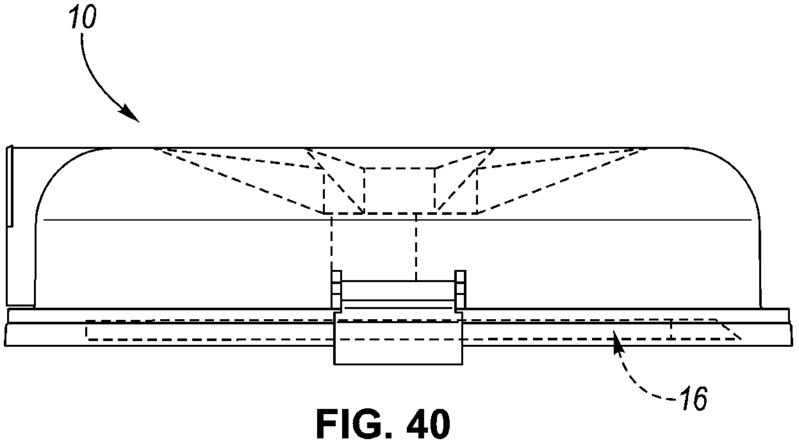
FIG. 40 shows a rear view of the separator shown in FIG. 36.

The ends 96 may include edges, pointed edges, smooth edges, slants, portions with decreasing thickness, tapers, the like, or a combination thereof. The overall shape of the separator plate 16 is thus a circle with cut-outs in the shape of the passage 22 defined by the plate's edge(s). The passage 22 being formed by the edge(s) of the separator plate 16 and the bottom portion of the wall 30, the lip 15, or both of the top member 11. Non-limiting examples of the edges are shown at least in FIGS. 37 and 41.

The separator plate 16 may be temporarily or permanently attached to the top member 11. The connection of the separator plate 16 to the top member 11 may be exclusively via the rim 23. The separator plate 16 may be attached to the lip 15 mechanically, adhesively, by a snap-fit connection, by a mechanism described above, the like, or a combination thereof. The rim 23 may include threads enabling the separator plate 16 to be screwed into the lip 15 of the top member 11.

Figure 24:
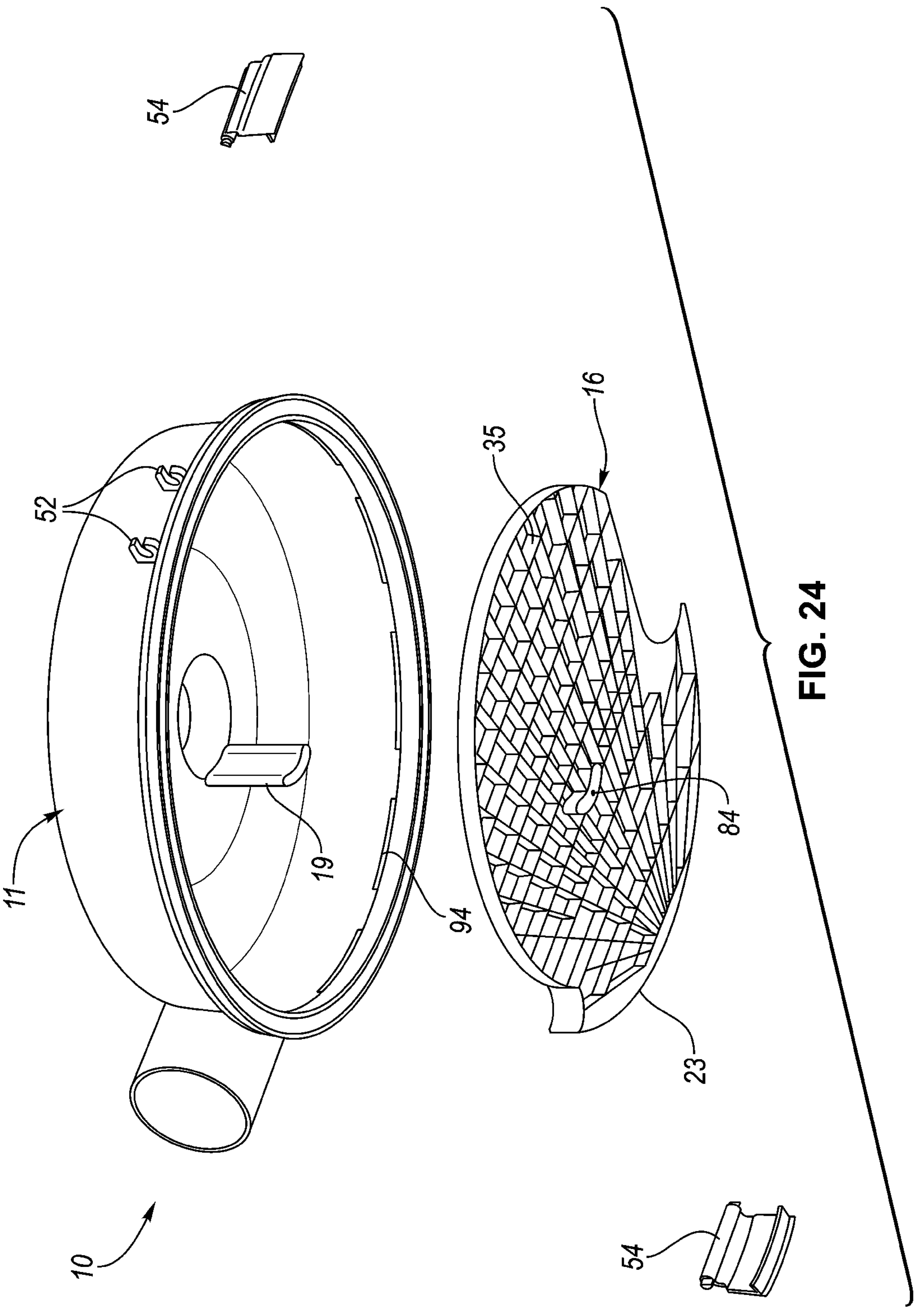
FIG. 24 shows an exploded view of the separator shown in FIG. 16 including the top member, the separator plate, and two attachment devices.
Figure 30:
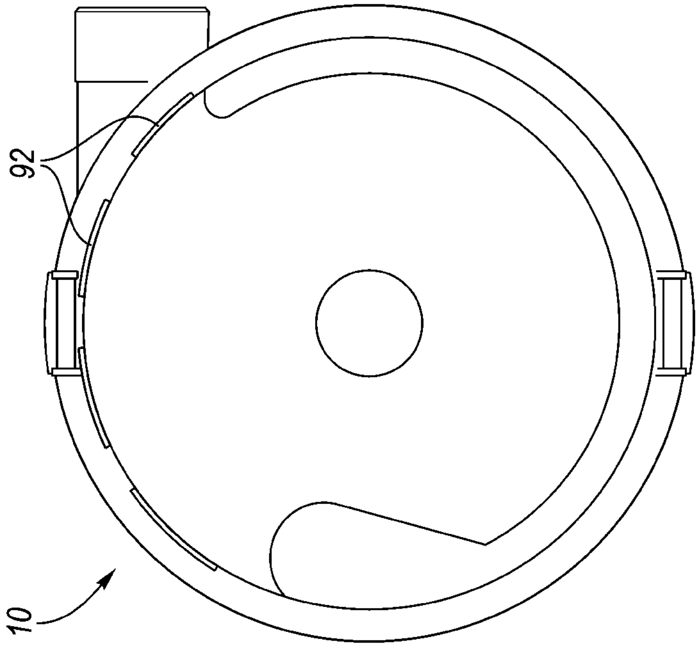
FIG. 30 shows a bottom view of the separator shown in FIG. 16 with a grounding element.
Figure 29:
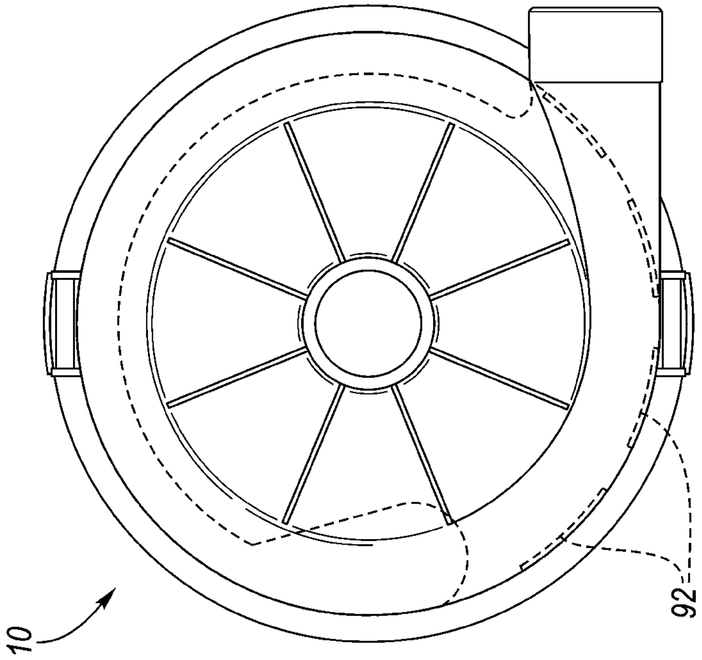
FIG. 29 shows a top view of the separator shown in FIG. 16.
Figure 31:
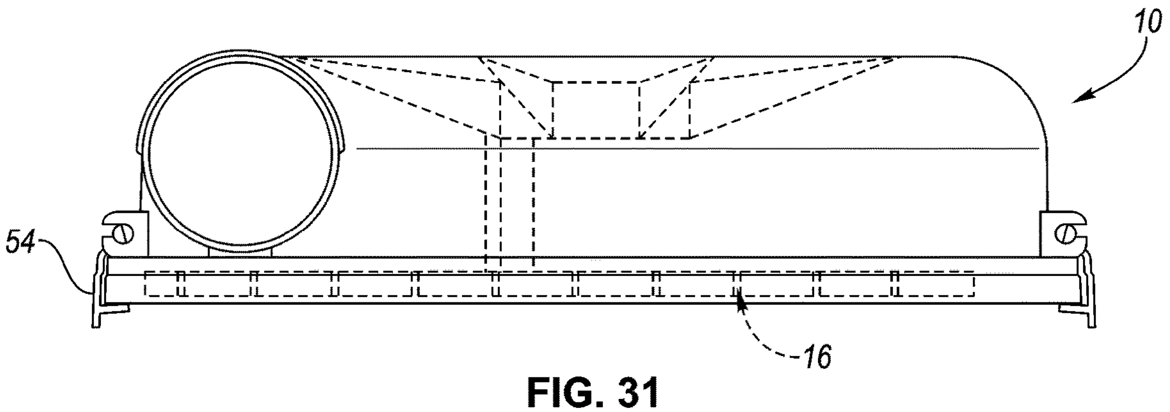
FIG. 31 shows a right view of the separator shown in FIG. 16.
Figure 32:
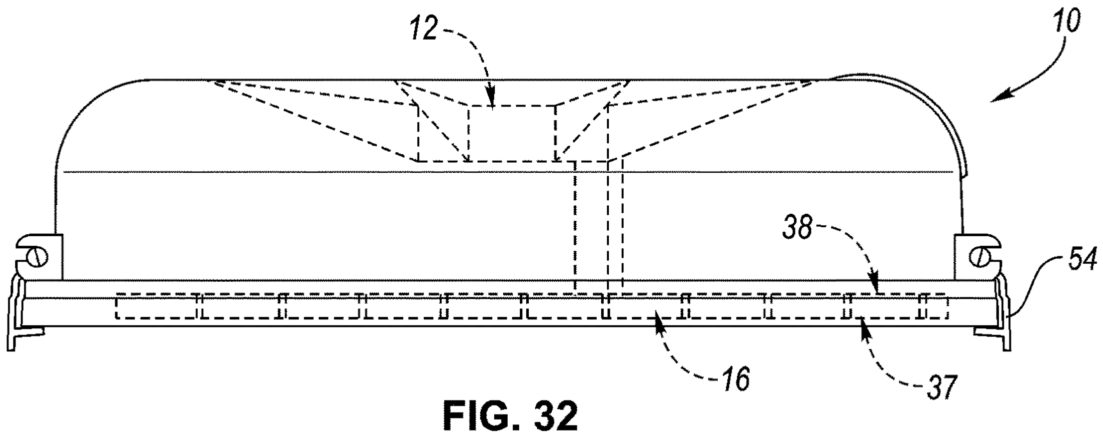
FIG. 32 shows a left view of the separator shown in FIG. 16.
Figure 33:
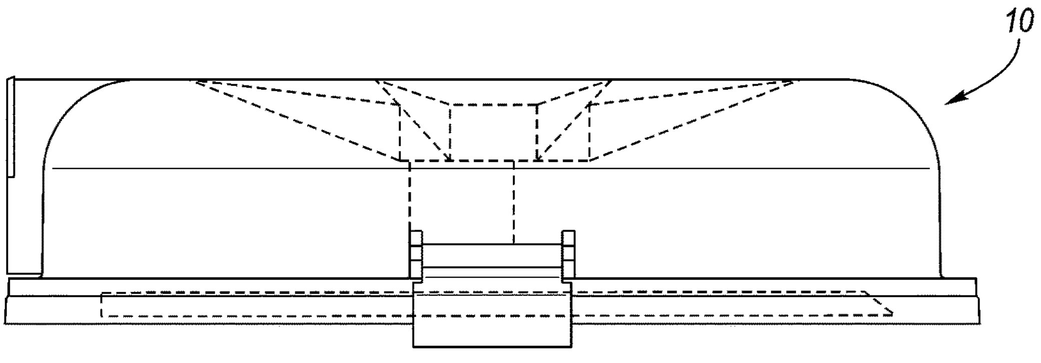
FIG. 33 shows a rear view of the separator shown in FIG. 16.
Figure 34:
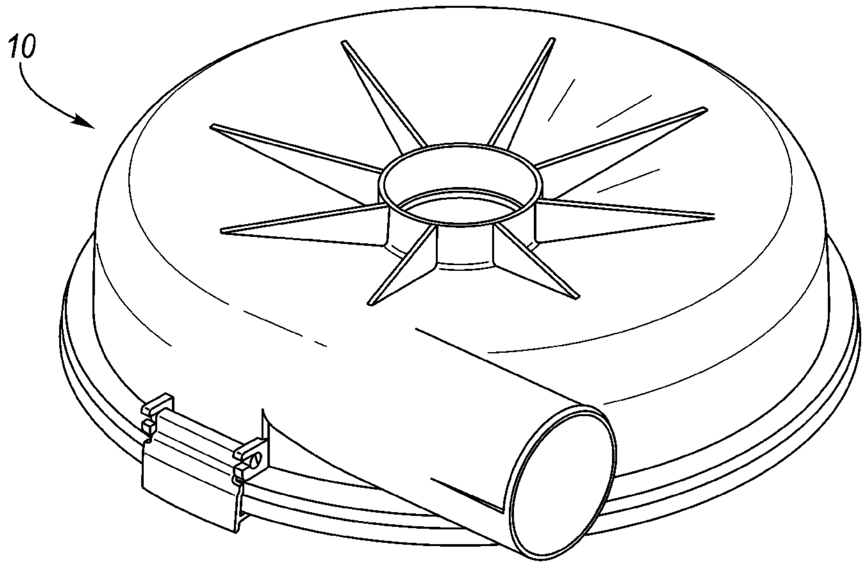
FIG. 34 shows a top front right perspective view of the separator shown in FIG. 16.
Figure 35:
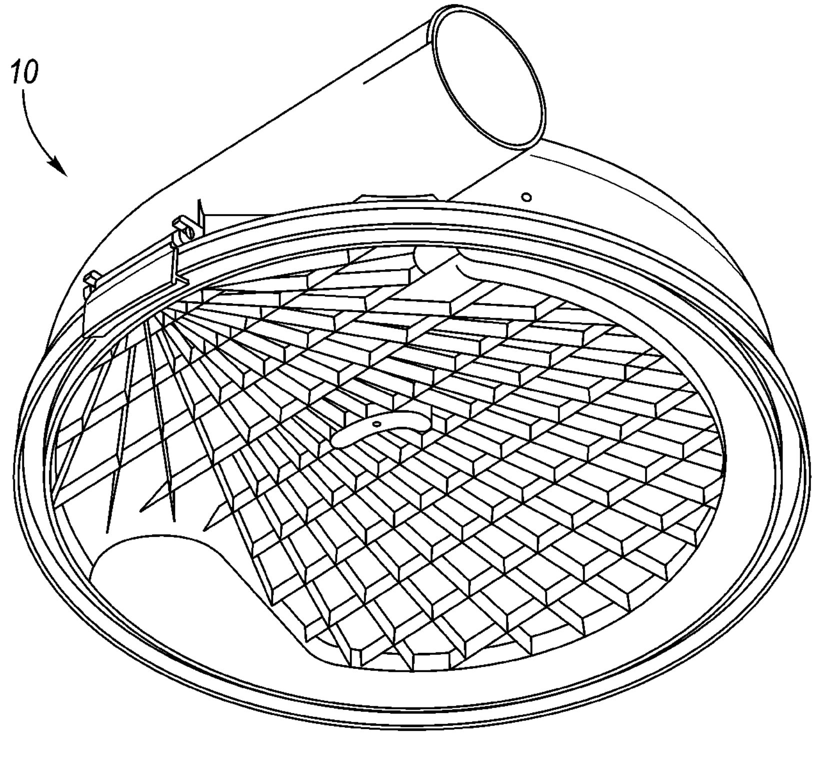
FIG. 35 shows a bottom front right perspective view of the separator shown in FIG. 16.
Figure 36:
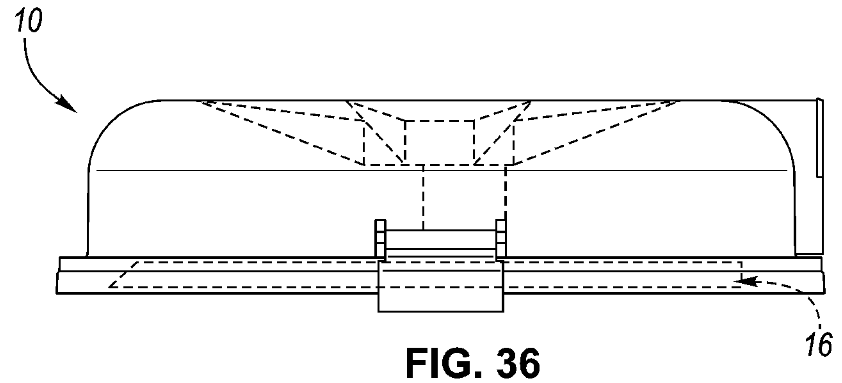
FIG. 36 shows a front view of the separator according to one or more embodiments disclosed herein.

An alternative connection may include tabs, fins, triangular, or arrow shaped protrusions 92 which may fit into one or more notches, openings, semi-openings, indentations, slots 94 formed in the top member 11, the lip 15, or both. The separator plate 16 may be inserted into the notches 94 by snapping, sliding, pushing, rotating, etc. The notches 94 may be included around the circumference, or a portion of the circumference, of the top member 11, corresponding to the placement of the protrusions 92 on the separator plate 16. Non-limiting example of the protrusions are shown in FIGS. 29 and 30. Non-limiting example of the notches are shown in FIG. 24.

Figure 21:
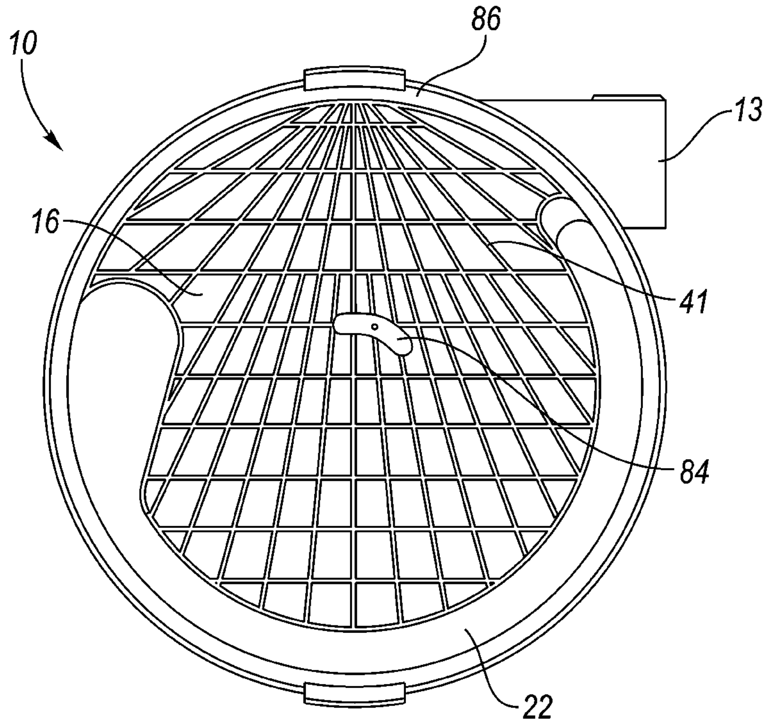
FIG. 21 shows a bottom view of the separator shown in FIG. 16.
Figure 22:
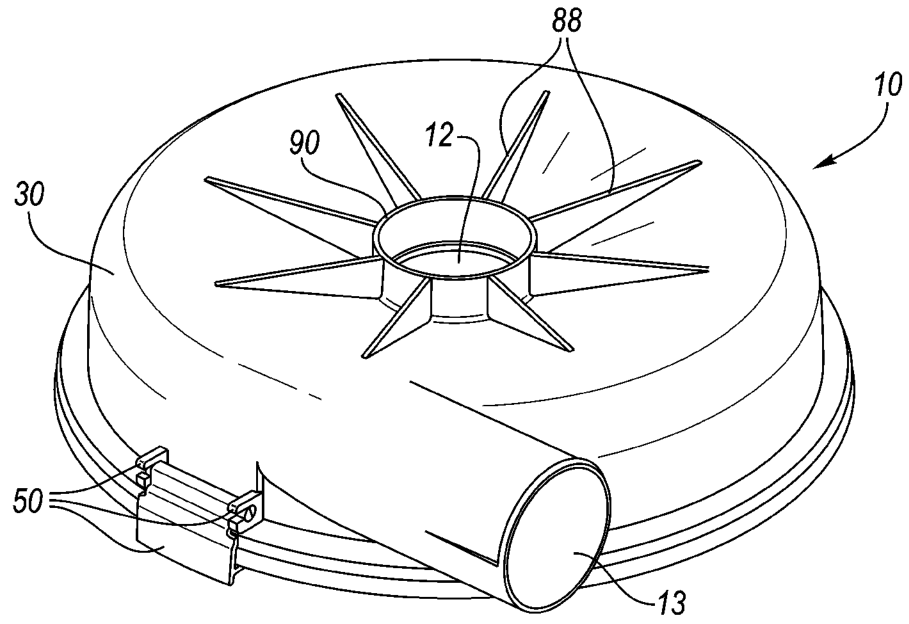
FIG. 22 shows a top front right perspective view of the separator shown in FIG. 16.
Figure 41:
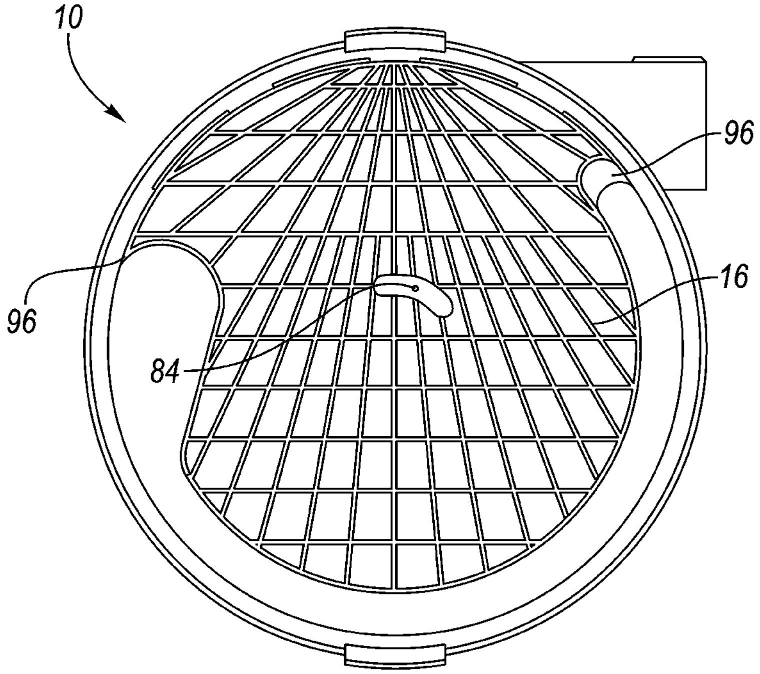
FIG. 41 shows a bottom view of the separator shown in FIG. 36.

Alternatively or in addition, the attachment of the separator plate 16 into the top member 11 may be via a point 84 formed in the separator plate 16. The point may be located in the central portion of the separator plate 16. A non-limiting example of the placement of the point 84 is shown in FIGS. 21, 24, and 41. The point 84 may be located where the deflector's 19 bottom surface is in contact with the top side of the separator plate 16. The separator plate 16 may include a piece of hardware configured to securely attach the separator plate 16 to the deflector 19. The separator plate 16, the deflector 19, or both may have an opening for the attachment hardware. The hardware may include a screw, bolt, staple. The attachment may be provided adhesively such that no opening is required.

The point 84 may be a single attachment point of the separator plate 16 to the top member 11. Alternatively, the point 84 may be one of a number of attachments of the separator plate 16 to the top member 11.

In at least one embodiment, the top member 11 is lip-free such that the outer wall 30 is flush with the lower portion of the top member 11. The separator plate 16 is housed within the outer wall 30 of the top member 11 instead of within the lip 15. The separator plate 16 may be attached adhesively, mechanically, snapped in place, inserted within a ridge formed in the lower portion of the outer wall 30 configured for the purposes of inserting the separator plate 16 within the material of the top member 11, by another method or device, or a combination thereof.

As was mentioned above, the main portion 35 of the separator plate 16 may have an irregular shape defined by a tapered passage 22. The tapered passage 22 may have varying dimensions throughout its length. The tapered passage 22 may include a wide portion 20 and a narrow portion 24. The wide portion 20 has a first end 31 arranged adjacent to or nearby to the point where the inlet 13 forms an opening 17 into the cyclonic chamber 14. The wide portion includes a second end 29, where the wide portion 20 narrows and where the width of the wide portion 20 is the smallest within the wide portion 20.

The narrow portion 24 includes a first end 27, located nearby to the point where the second end 29 of the wide portion 20 ends, and continues along the periphery of the lip 15 until the second end 25. The second end 25 of the narrow portion 24 may have a wider dimension than the remainder of the narrow portion 24 and form an enlarged opening. The location of the first end 27 of the narrow portion 24 may differ and is defined by the point at which the passage 22 or the wide portion 20 of the passage 22 starts to widen. The width of the wide portion 20 may increase in the direction from the second end 29 to the first end 31 of the second portion 20. The first end 31 of the wide portion 20 may form an enlarged opening. The enlarged opening may have a shape of a teardrop or lanceloid having an extended curved upper side. The first end 31 may define an opening proximal to the inflow of debris and particulate laden air. The first end 31 tapers towards the narrow portion 24 that allows smaller debris and fine particulates to exit the cyclonic chamber 14. As is explained later, particulates that enter the chamber 14 are acted upon by inertia and centrifugal forces which cause them to travel along the outer wall 30 of the chamber 14 until gravity and changes in air pressure within the cyclonic chamber 14 cause the particulates and other larger debris to leave the chamber 14 through a separator plate 16 having a larger opening at the point closest to where the air enters the chamber 14, at the first end 31. The separator 10 thus eliminates larger debris via an extended opening at the first end 31 and the finer particulates via a smaller opening at the opposite end of the passage, at the second end 25 of the narrow portion 24.

The first end 31 of the wide portion 20 may have a width $w_1$ approximately equal to, or slightly narrower than the diameter $d_1$ of the inlet 14. A width slightly smaller than the diameter of the inlet 14 may cause lower turbulence (compared to a width equal to the diameter of the inlet) as air enters the chamber 14, which in turn may improve fine particulate separation. The width of the wide portion 20 may increase in the direction from the second end 29 to the first end 31 of the second portion 20.

The narrow portion 24 has a smaller width than the width of the wide portion 20. The narrow portion 24 may have a constant width. The second end 25 of the narrow portion 24 may be slightly wider than the remainder of the narrow portion 24 and form an enlarged opening. The second end 25 of the narrow portion 24, has a width $w_2$, which may be about 25-30% of the diameter of the inlet 13 $d_1$.

Proper alignment of the wide end 20 of the tapered passage 22 with the flow of dust passing through the opening 17 causes most of the debris to quickly pass through the tapered passage 22 and into the collection container 18 below. The narrow end 24 allows other particulates to pass to the collection container 18 as they leave the cyclonic flow of air within the chamber 14.

The total length of the tapered passage 22 is about ½ to ⅔ the circumference of the chamber 14, or approximately 180 to 240 degrees. The location and dimensions of the tapered chamber 22 may be derived from empirical data based on the types of dust to be collected, i.e. wood, sand, metal, etc.

Figure 42:
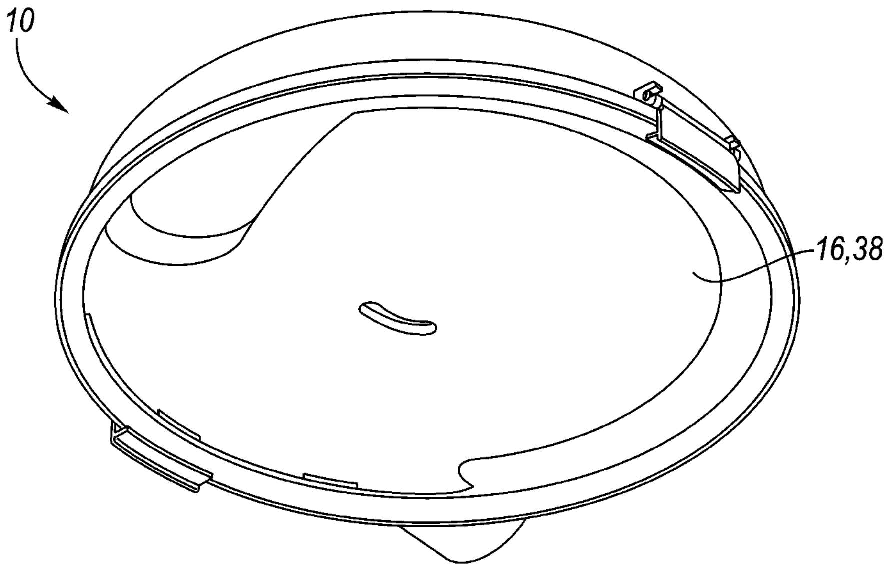
FIG. 42 shows a top front right perspective view of the separator shown in FIG. 36.
Figure 43:
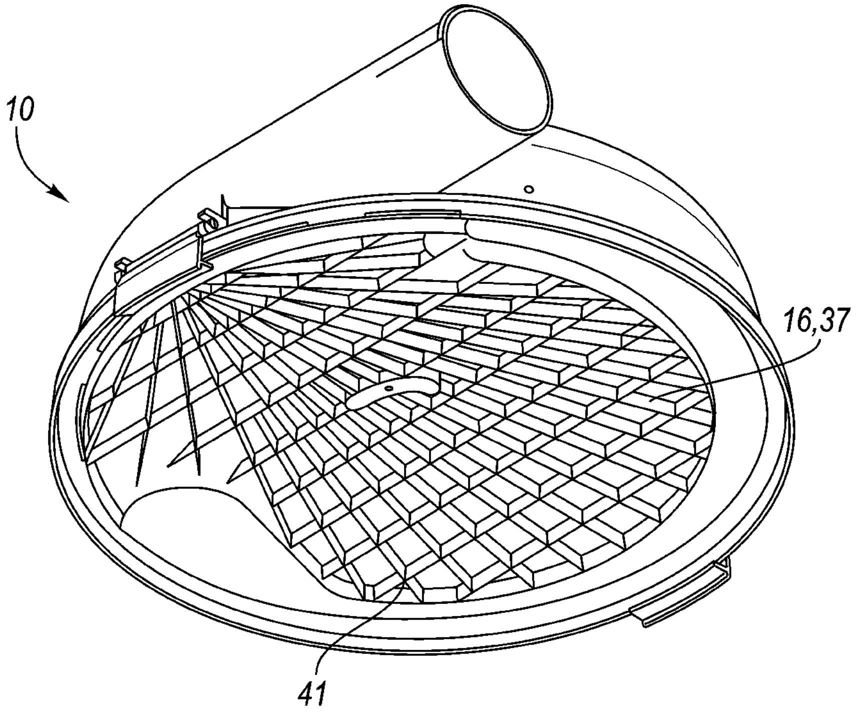
FIG. 43 shows a bottom front right perspective view of the separator shown in FIG. 36.

The separator plate 16 has a lower side 37 facing away from the top member 11 and a top side 38 facing towards the chamber 14 and forming the bottom portion of the chamber 14. The entire separator plate 16 may be solid. Both the lower side 37 and the top side 38 may have a smooth surface, example of which is shown in FIG. 42. The top side 38 may be smooth to minimize presence of obstructions and eddy currents the air encounters in the chamber 14.

Alternatively, the lower side 37 may include indentations 41, depressions, notches, the like, or a combination thereof, non-limiting examples of which are depicted in FIGS. 5, 13, 15, 21, 23, 24, 34, 35, and 43. The indentations may have a regular or irregular shape. The indentations may include ridges, ribs, or both. The ridges or ribs may have the same or different dimensions, length, thickness, shape, direction, density, the like, or a combination thereof. For example, as is shown in FIGS. 21 and 24, the ridges may run in a common direction. The direction may be, for example, from a side 86 of the inlet 13 towards at least a portion of the passage 22 or all portions of the passage 22. The indentations 41 may spread radially from a general point or area, such as the side 86. The indentations 41 may form rays. The density of the indentations may increase or decrease in a direction. The change may be gradual or sudden.

The cross-section of the indentations 41 may be square, rectangular, circular, semi-circular, oval, diamond, pentagon, hexagon, heptagon, octagon, nonagon. The cross-section, geometry, orientation, size, shape, and/or configuration of the indentations 41 may be different or the same throughout the lower side 37. The indentations 41 may be arranged in a pattern. The pattern may be regular or irregular. The indentations 41 may be arranged in rows. The depicted non-limited example pattern is a waffle pattern, honeycomb pattern, ray pattern. The indentations 41 may be included to reduce the amount of material used to produce the separator plate 16. Presence of the indentations 16 should not compromise rigidity of the separator plate 16. The indentations 41 may serve an additional function such as reducing turbulence. For example, residual air turbulence may exist in the collection container 18. As the collection container 18 fills with separated material and debris, the air turbulence may cause re-entrainment of some particulate matter into the air stream within the system. Presence of the indentations 41 may reduce or eliminate the re-entrainment phenomenon. The lower side 37 may include one or more sections which are indentation-free. The rim 23 may be indentation-free.

The shape of the set of indentations 41 may influence several manufacturing and dust-removing factors such as rigidity, cooling of the material during manufacture, cycle time of the separator plate manufacturing, settling of the dust, or a combination thereof. For example, the ray distribution of the indentations 41, such as shown in FIG. 21, may contribute to even settlement of the dust in the container 18 once collected and separated via the separator 10.

The separator plate 16 may be hollow or partially hollow such that the plate is thick enough to include a central portion in addition to the lower side 37 and the upper side 38. For example, the separator plate 16 may include indentations 41 on the lower side 37, which protrude into the central portion of the plate 16. The remainder of the central portion may be hollow. Alternatively, the central portion may be filled with material, the material being the same or different material as the remainder of the separator plate 16.

Figure 6A:
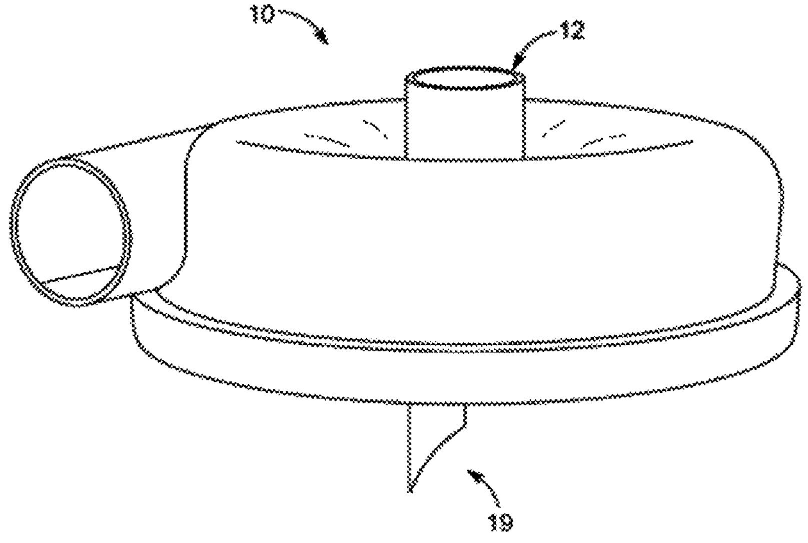
FIG. 6A shows a perspective schematic view of the outlet port having a deflector plate.
Figure 6B:
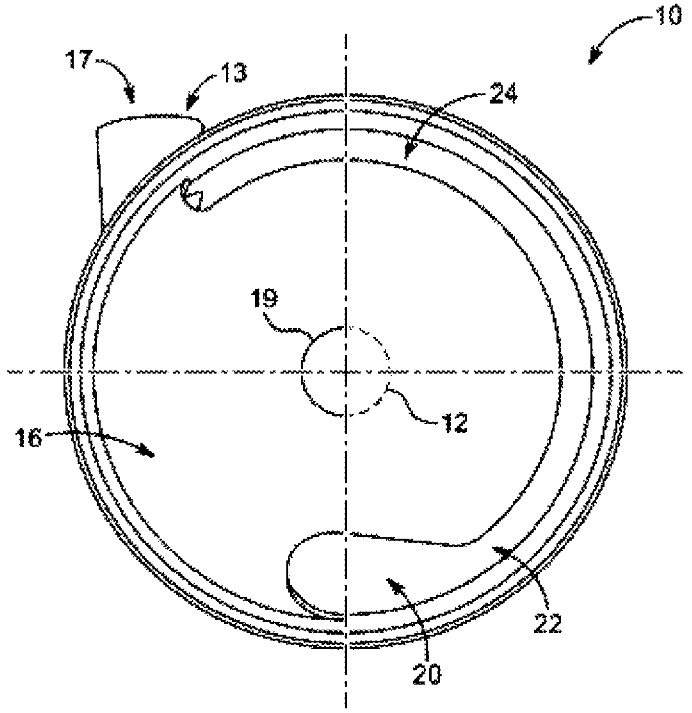
FIG. 6B shows a top view of the low-profile cyclonic dust separator having a deflector plate.

In one or more embodiments, depicted in FIGS. 6A and 6B, a deflector plate 19 may be an extension of the outlet port 12. The deflector plate 19 may run alongside a portion of the frustum 34. The deflector plate 19 may slope towards the separator plate 16. The deflector plate 19 may be an elongated, thin strip of a material. The shape of the deflector plate 19 may be rectangular, triangular, regular, irregular, the like, or a combination thereof. The deflector plate 19 may be curved. The curve may include a bowed-out portion, which may be directed towards the inlet port 13. The deflector plate 19 may be configured along the outer periphery of the separator plate 16. The deflector plate 19 may be made from the same or different material as the top member 11, the separator plate 16, or both. The deflector plate 19 may be smooth. The deflector plate 19 may be flexible. The roughness of the deflector plate 19 may be greater or smaller than the roughness of the top side 38 of the separator plate 16 surface. The deflector plate 19 may strengthen the separator plate 16, improve the rigidity of the separator plate 16, eliminate undesirable deflection of the separator plate 16 in the direction of the outlet 12, support at least a portion of the separator plate 16, maintain the distance between the separator plate 16 and the output port 13, or a combination thereof. The deflector plate 19 may support a central portion of the separator plate 16. Additionally, the deflector plate 19 may improve separation performance. The deflector plate 19 may be an extension of the inlet 17. The height of the deflector plate 19 may equal the distance between the separator plate 16 and the bottom rim of the outlet 12. A non-limiting example of the deflector plate 19 is shown in FIG. 24.

Without limiting this disclosure to a single theory, it is believed that a relationship between the shape of the cyclonic chamber 14, presence of the inverted frustum 34, the tapered passage 22 in the separator plate 16, and/or the position of the chamber opening 17 enables to achieve separation efficiency exceeding 99%. The size, shape, and relative position of the tapered passage 22 may have an impact on the dust-separator's 10 ability to remove fines from incoming dust-laden air. The wide end 20 of the tapered passage 22 enables removal of larger debris soon after the debris enters the chamber 14 while providing additional time to the fines to agglomerate as they move around the chamber 14 in the cyclonic flow of air.

The tapered shape of the passage 22 from the second end 31 of the wide portion 20 to the first end 25 of the narrow portion 24 at the opposite end of the passage 22 minimizes turbulence within the chamber 14 and encourages formation of agglomerated fines. The type and size of the target media to be collected determine some of the adjustable parameters of the passage such as the size and placement of the wide portion 20, the degree of taper to the narrow portion 24, the termination of the narrow portion 24, the like, or a combination thereof. Thus, the specifications of the tapered passage 22 may be altered to optimize collection of fines having different specific gravities.

The size and shape of the inlet 13 should be compatible with the delivery vessel. The inlet 13 may be tubular. The inlet port 13 does not extend into the chamber 14. The inlet 13 terminates in the opening 17 at the point of intersection of the inlet port 13 with the chamber 14. The inlet 13, depicted for example in FIG. 4, is sized to provide a connection of a hose, tube, duct, or a like device to the top member 11. The dust-laden air enters the separator 10 via the inlet 13. Alternatively, a connection piece (not depicted) may be attached to the inlet 13. The connection piece may be adjustable such that hoses of different diameters may be connected to the separator 10. The inlet 13 should be positioned in a way that allows air to move into the separator 10 along a path that is tangential to the separator chamber 14. It is desirable to have all movement of air avoid sharp turns or other changes in surface conditions within the chamber 14 that could cause eddies, or air turbulence, that might impede separation efficiency. The opening 17 between the inlet 13 and the chamber 14 is derived from the intersection of the inlet 13 and the chamber 14 surfaces when mated together.

Dust-laden air may be forced by pressure through the hose which is connected to the inlet 13 of the separator 10, or it may be drawn through the inlet 13 by the presence of vacuum originating from an external source. A source of low pressure may be a shop vacuum, or some other network of ducting where low pressure exists as part of a central vacuum system. In operation, a pressure differential exists between the inlet 13 and the outlet 12. The pressure differential causes the dust-laden air to rapidly flow through the chamber 14 from which the dust exits at the outlet 12. Air flowing through the chamber 14 is caused to spin in a cyclone, which produces a vortex near the center of the chamber 14. As can be seen in FIG. 4, the outlet 12 is located in or near the center of the chamber 14, the top member 11, or both. The outlet 12 is arranged at a vortex locator 40 which is derived from and defined by the intersection of the outlet 12 with the inverted frustum 34. The frustum 34 or top of the top member 11 and the center of the inlet 13 may be close to the same plane 36 for optimal separation.

Just like the inlet 13, the outlet 12 is sized to provide a connection of a hose, tube, duct, or a like device to the top member 11. Alternatively, a connection piece (not depicted) may be attached to the outlet 12, enabling connection of hoses of different diameters. The inlet 13 and the outlet 12 may have the same shape, size, dimension, configuration, the like, or a combination thereof.

The outlet port 12 may be a male connector or a female connector. The female connector refers to a connector structured to receive a hose within its diameter. The male connector refers to the shape and diameter of the outlet configured to be inserted within a hose. The height of the port 12 may extend beyond the height of the remaining portions of the top member 11, as is depicted in FIG. 3. Alternatively, as is shown at least in FIG. 8-12 or 16-22, the port 12 may have such height that the top rim 90 of the port 12 does not exceed the total height of the chamber 14, the remaining portions of the top member 11, the height of the wall 30. The height of the outlet 12 may be such that the top rim of the outlet 12 is flush with the top portion of the dome, wall 30, the top member 11. The outlet 12 thus does not require additional space in packaging and adds to an overall compact design of the disclosed separator 10.

The process of separating dust and debris from the air that carries the undesirable particulate matter starts at the intersection of the inlet 13 with the chamber 14 where the flow of air is caused to turn. Air tangentially enters the chamber

14 through its opening 17 and is forced to spin in a cyclonic fashion within the chamber 14. Particles having greater mass are then forced to move away from the center of the chamber 14 by the centrifugal force. Particles with greater mass are less affected by the buoyancy and tend to move quickly to the outer wall 30 of the chamber 14. Particulates carried by the cyclonic movement of air within the chamber 14 are constantly under the influence of centrifugal force. As very fines having lower mass agglomerate, the particulates continue to move away from the center of the chamber 14. Eventually, the particulates will reach a point where centrifugal force and gravity forces them to fall through the tapered passage 22 into the collection container 18, if one is attached to the separator 10. Forces of gravity and inertia then act on the remaining particulates and debris, causing them to quickly exit the chamber 14 via the wide portion 20 of the tapered passage 22.

Smaller particles, commonly referred to as fines, may not respond immediately to the centrifugal force and therefore may remain at the top of the chamber 14, suspended in the circular flow of air along the face 39 of the inverted frustum 34. As these fine particles flow along the frustum's face 39, and move in the general direction of the outlet 12, the particles begin to agglomerate into larger particles having a greater mass. As the particles' mass increases, so does their response to the centrifugal force. The smaller radius of the air's rotation close to the vortex locator 40 combined with the higher mass of the now larger particles eventually causes them to break free of the air stream and move toward the outer perimeter of the cyclonic chamber 14. Upon reaching the outer wall 30, the now-agglomerated fines blend with larger incoming debris and are forced to pass through the tapered passage 22 and into the collection container 18 below. The particulates may enter the collection container 18 via any point in the passage 22.

Figure 5:
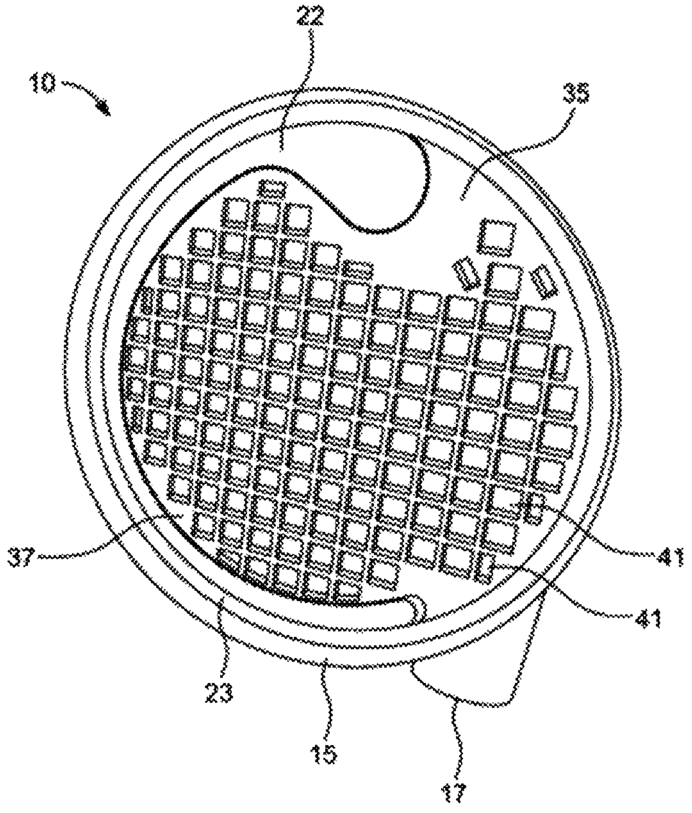
FIG. 5 depicts a bottom view of an alternative separator plate of the low-profile cyclonic dust separator.

FIG. 5 illustrates a non-limiting example of an application of the separator 10 in a woodworking shop. In FIG. 5, the separator 10 is arranged to collect dust and wood tailings from an example tool, a wood planer 45, before the air passes into the shop vacuum 43. In this, and other applications where a tool generating polluted air is used, a collection hose 47 may be used to carry effluent air from the tool 45 that is entrained with byproduct of the tooling operation. The dust-laden air moves through the collection hose 47 to the separator 10 via the inlet 13. The air, upon entering the cyclonic separator 10, is cleaned in a manner previously described, and then continues to the shop vacuum 43 via a delivery hose 49. Optimal dust collection is achieved when all couplings of the hoses to their respective attachments are snuggly fitted. Alternately, the distal end 46 of the collection hose 47 may be removed from the tool 45 and moved about manually to pick up loose dust and debris from various locations in the shop. Attaching the distal end 46 to a grill or grate (not depicted) that is located in an area where dust-laden air lingers may be an effective way to clean unmoving air that has become entrained with particulates.

The manner of dust separation described herein may have useful applications where the volume of air to be cleaned varies significantly. Therefore, the overall size of the separator 10 may need to be scaled to accommodate connections with larger collection and delivery hoses, ducts, or vessels used for moving air. For example, a separator which is used in conjunction with a shop vacuum may be connected to collection and delivery hoses with diameters of about 10 to 1⁄16, 5 to 1⁄8, or 2 to 1⁄4 inches, or other sizes. The separator may have a diameter of about 8 to 25, 10 to 20, or 12-15 inches, or approximately about 5-6 times the diameter of the inlet. When the separator is used in conjunction with a central vacuum (not depicted), one might anticipate the need to connect to other inlets and outputs having diameters in the range of about less than about 1 to 10, 1.5 to 8, or 2 to 6 inches or more. These separators may work most efficiently if their diameter is adjusted to something in the about 40 to 10, 30 to 15, or 20 to 25 inches range. Actual dimensions are less important than are the ratios and placement of the operating elements of the dust separator.

Non-limiting example ratios may include a ratio of width $w_1$ of the first end 31 of the wide portion 20 of the passage 22 to the width $w_2$ of the second end 25 of the narrow portion 24 of the passage 22 in relation to the diameter $d_1$ of the input port 13, the output port 12, or both. The diameter $d_1$ of the input port 13 may equal, or be substantially the same as the diameter $d_4$ of the output port 12. $w_1$ may equal $d_1$ and/or $d_4$ while $w_2$ may equal about 15 to 35%, 20 to 30%, or 22 to 27% of $w_1$. $w_2$ may be about 25% of $w_1$. Another relevant non-limiting example ratio may include a ratio of the diameter $d_1$ of the input port 13, the output port 12, or both to the radius $r_1$ or diameter $d_2$ of the tubular member 11. The diameter $d_2$ of the tubular member 11 may equal the diameter $d_3$ of the separator plate 16. $r_1$ may equal or be greater than $d_1$. $d_2$, and/or $d_3$ may equal or be greater than two times $d_1$.

Figure 18A:
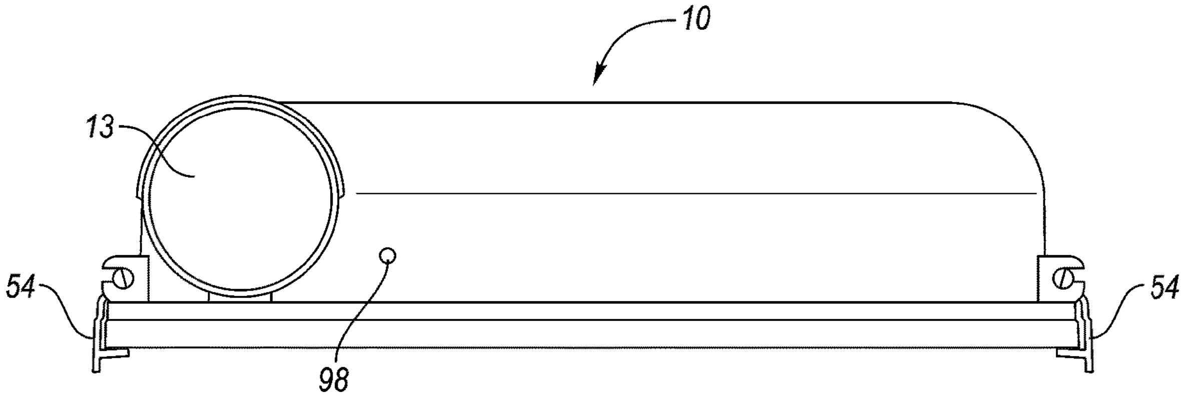
FIG. 18A shows a right view of the separator shown in FIG. 16.
Figure 18B:
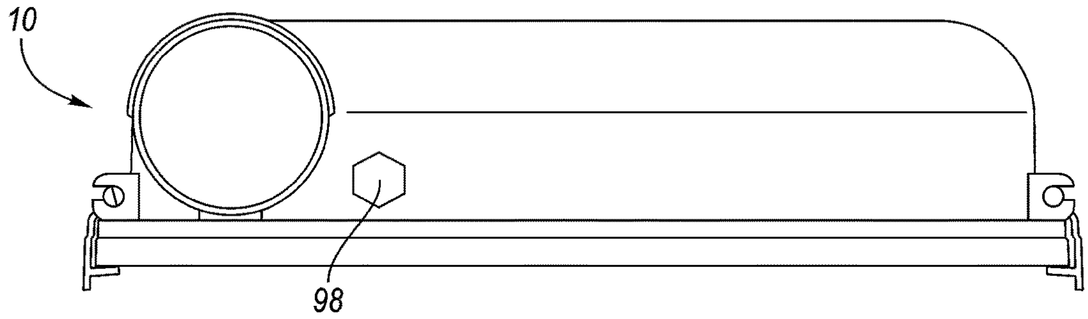
FIG. 18B shows a right view of the separator shown in FIG. 16 with a grounding element.
Figure 19:
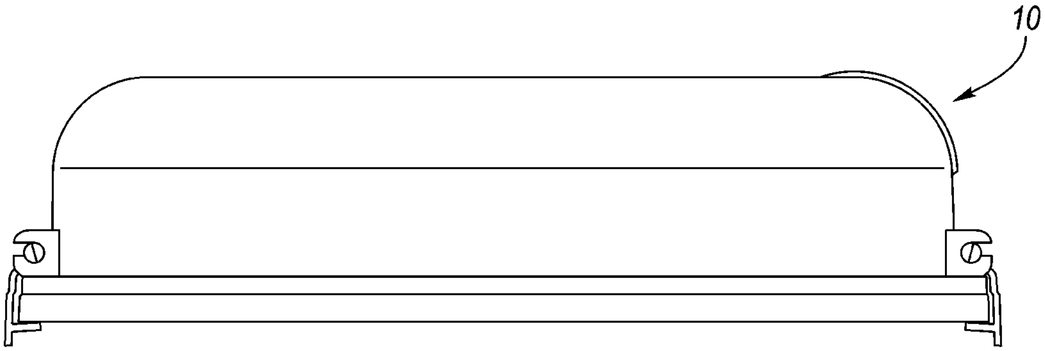
FIG. 19 shows a left view of the separator shown in FIG. 16.
Figure 20:
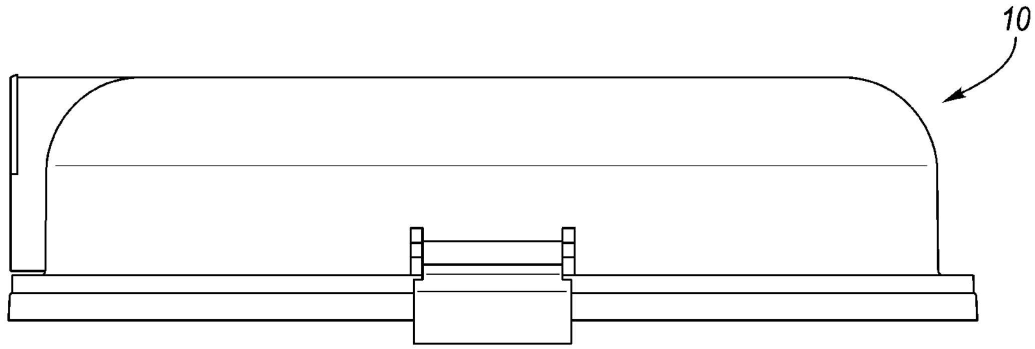
FIG. 20 shows a rear view of the separator shown in FIG. 16.

The separator 10 may further include a grounding feature 98 to manage static electricity buildup when the separator 10 is in use. The grounding feature 98 may include an insertion port, opening, dimple, a point with decreased material thickness, a grounding hardware such as a bolt, screw, nut, wire, the like, or a combination thereof. A non-limiting example of the grounding feature 98 is shown in FIGS. 18A, 18B. A location of the grounding element in the figures is only exemplary. The grounding element may be located elsewhere on the top member 11. In a non-limiting embodiment, the grounding element may be located adjacent to the inlet port 13.

The top member 11, the separation plate 16, or both may be made from any suitable material. For example, the top member 11, the separation plate 16, or both may be made from polymeric material, metal, wood, ceramic, the like, or a combination thereof. For example, the polymeric material may be a thermoset or a thermoplastic. Example materials may include polyethylene, polypropylene, polycarbonate, polyurethane, polyamide, polyimide, polyvinylchloride, nylon the like, or a combination thereof. The top member 11, the separation plate 16, or both may be made from a biodegradable material. The top member 11, the separation plate 16, or both may be made from an anti-static material. The top member 11, the separation plate 16, or both may be made from a composite material including fibers. The fibers may be natural or synthetic fibers. The top member 11, the separation plate 16, or both may be made by any suitable method. The top member 11, the separation plate 16, or both may be made in one or more steps. The top member 11, the separation plate 16, or both may be made as one unitary compact piece or two separate pieces, for example by injection molding, blow molding, stamping, or the like. Alternatively, the top member 11, the separation plate 16, or both may be assembled from more than one piece. The top member 11, the separation plate 16, or both may be solid structures without any apertures besides the inlet 13, the outlet 12 of the top member 11 and the tapered passage 22 of the separator plate 16.

According to an embodiment, an overall ornamental appearance of the extended inlet port is illustrated in FIGS. 8 to 15. According to an embodiment, an overall ornamental appearance of the dome or top member is illustrated in FIGS. 16 to 23. According to yet another embodiment, an overall ornamental appearance of the latch is illustrated in FIGS. 28 to 35. According to another embodiment, an overall ornamental appearance of the plate is illustrated in FIGS. 36 to 43.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cyclonic particle separator comprising:

a first member having an arcuate outer wall and an inlet port having a diameter d1 extending from the arcuate outer wall in a first direction and an outlet port extending from the arcuate outer wall in a second direction, the first direction being different than the second direction;

a separator plate in communication with the first member; and a cyclonic chamber defined by the separator plate and the arcuate outer wall, the cyclonic chamber, the separator plate, and the outlet port having a common central axis, a passage extending between a first edge and a second edge of the separator plate downstream of the first edge in a direction of airflow, the first and second edges circumferentially separated about the common central axis by an angle in a range of 180 degrees to 240 degrees, wherein the passage includes a relatively wide portion adjacent the first edge and a relatively narrow portion adjacent the second edge.

2. The cyclonic particle separator of claim 1, wherein a height of the arcuate outer wall is approximately equal to the diameter d1 of the inlet port.

3. The cyclonic particle separator of claim 1 wherein the passage extends uninterrupted in a range of 180 degrees to 240 degrees adjacent the arcuate outer wall.

4. The cyclonic particle separator of claim 1, wherein the second direction is perpendicular to the first direction.

5. The cyclonic particle separator of claim 1, wherein the outlet port has a uniform diameter.

6. The cyclonic particle separator of claim 1 further comprising a deflector plate extending between the outlet port and the separator plate.

7. The cyclonic particle separator of claim 1, wherein the separator plate includes a snap-fit connection to the first member.

8. The cyclonic particle separator of claim 1, wherein the outlet port has a height less than or equal to a height of the arcuate outer wall.

9. The cyclonic particle separator of claim 1, wherein the outlet port is a female port.

10. The cyclonic particle separator of claim 1, wherein the first member includes one or more reinforcement elements located adjacent to the outlet port.

11. The cyclonic particle separator of claim 1, further comprising a grounding element.

12. The cyclonic particle separator of claim 1, wherein the separator plate abuts the the arcuate outer wall about less than half of an outer periphery of the separator plate.

13. The cyclonic particle separator of claim 1, wherein the first edge includes a first concave edge and the second edge includes a second concave edge opposite the first concave edge.

14. A cyclonic particle separator comprising:

a first member having an arcuate outer wall and an inlet port having a diameter d1 extending from the arcuate outer wall in a first direction and an outlet port extending from the arcuate outer wall in a second direction, the first direction being different than the second direction;

a separator plate in communication with the first member; and a cyclonic chamber defined by the separator plate and the arcuate outer wall, the cyclonic chamber, the separator plate, and the outlet port having a common central axis, wherein the outlet port includes a deflector plate extending from a bottom rim of the outlet port through the cyclonic chamber to the separator plate, and wherein the separator plate includes a central portion having a point structured to attach the first member to the separator plate via the deflector plate.

* * * * *